US011803676B2

(12) United States Patent
Wang et al.

(10) Patent No.: US 11,803,676 B2
(45) Date of Patent: *Oct. 31, 2023

(54) SCALABLE SYSTEM AND ENGINE FOR FORECASTING WIND TURBINE FAILURE

(71) Applicant: Utopus Insights, Inc., Valhalla, NY (US)

(72) Inventors: Yajuan Wang, White Plains, NY (US); Gabor Solymosi, Solymar (HU); Ede Szarka, Budapest (HU); Younghun Kim, Pleasantville, NY (US)

(73) Assignee: Utopus Insights, Inc., Valhalla, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/209,695

(22) Filed: Mar. 23, 2021

(65) Prior Publication Data

US 2021/0232731 A1    Jul. 29, 2021

Related U.S. Application Data

(63) Continuation of application No. 16/234,455, filed on Dec. 27, 2018, now Pat. No. 10,956,632.

(51) Int. Cl.
*F03D 17/00* (2016.01)
*H02J 3/38* (2006.01)
(Continued)

(52) U.S. Cl.
CPC ............. *G06F 30/20* (2020.01); *F03D 17/00* (2016.05); *G06N 20/00* (2019.01); *H02J 3/38* (2013.01); *H02J 2203/20* (2020.01)

(58) Field of Classification Search
CPC ...... G06F 30/20; G06F 2119/02; F03D 17/00; G06N 20/00; G06N 5/003; G06N 20/20;
(Continued)

(56) References Cited

U.S. PATENT DOCUMENTS 10,956,632 B2 * 3/2021 Wang ................. G05B 23/0205
10,984,154 B2 * 4/2021 Wang .................... G01R 31/343
(Continued)

FOREIGN PATENT DOCUMENTS

CN    1662876 A * 8/2005 ............. G06F 17/18
JP    3535393 B2 * 6/2004
(Continued)

OTHER PUBLICATIONS

Y. Zhao and et al. "Fault Prediction and Diagnosis of Wind Turbine Generators Using SCADA Data," Energies, vol. 10. No. 8, Aug. 2017 (Year: 2017).*
(Continued)

*Primary Examiner* — Douglas Kay
(74) *Attorney, Agent, or Firm* — Ahmann Kloke LLP

(57) ABSTRACT

An example method utilizing different pipelines of a prediction system, comprises receiving event and alarm data from event logs, failure data, and asset data from SCADA system(s), retrieve patterns of events, receiving historical sensor data from sensors of components of wind turbines, training a set of models to predict faults for each component using the patterns of events and historical sensor data, each model of a set having different observation time windows and lead time windows, evaluating each model of a set using standardized metrics, comparing evaluations of each model of a set to select a model with preferred lead time and accuracy, receive current sensor data from the sensors of the components, apply the selected model(s) to the current sensor data to generate a component failure prediction, compare the component failure prediction to a threshold, and generate an alert and report based on the comparison to the threshold.

19 Claims, 23 Drawing Sheets

(51) Int. Cl.
*G06F 30/20* (2020.01)
*G06N 20/00* (2019.01)

(58) Field of Classification Search
CPC .......... H02J 3/38; H02J 3/386; H02J 2203/20; G05B 23/0205; F05B 2260/84; Y02E 10/76
See application file for complete search history.

(56) References Cited

U.S. PATENT DOCUMENTS

| | | | |
|---|---|---|---|
| 11,016,468 B1* | 5/2021 | Barker | G07C 3/08 |
| 11,188,691 B2* | 11/2021 | Wang | G06N 20/00 |
| 11,422,529 B1* | 8/2022 | Barker | G07C 3/005 |
| 2011/0313726 A1 | 12/2011 | Parthasarathy | |
| 2013/0073223 A1 | 3/2013 | Lapira | |
| 2015/0073751 A1 | 3/2015 | Liao | |
| 2017/0074250 A1 | 3/2017 | Yu et al. | |
| 2017/0310483 A1 | 10/2017 | Nagao | |
| 2017/0350370 A1 | 12/2017 | Son | |
| 2018/0223812 A1 | 8/2018 | Badrinath Krishna | |
| 2018/0320658 A1* | 11/2018 | Herzog | F03D 7/045 |
| 2019/0042887 A1 | 2/2019 | Nguyen | |
| 2019/0236456 A1* | 8/2019 | Kim | H02S 50/00 |
| 2020/0049129 A1 | 2/2020 | Girardot | |
| 2020/0201950 A1* | 6/2020 | Wang | F03D 17/00 |
| 2020/0210538 A1 | 7/2020 | Wang et al. | |
| 2020/0210824 A1 | 7/2020 | Poornaki | |

FOREIGN PATENT DOCUMENTS

| | | |
|---|---|---|
| WO | 2014043623 | 3/2014 |
| WO | 2018228648 | 12/2018 |

OTHER PUBLICATIONS

X. Clady and et al, "A Motion-Based Feature for Event-Based Pattern Recognition", Frontiers in Neuroscience | www.frontiersin. org, Jan. 2017 | vol. 10 | Article 594 (Year: 2017).*

Y. Song and et al, "Multiple Event Detection and Recognition for Large-Scale Power Systems Through Cluster-Based Sparse Coding", IEEE Transactions on Power Systems, vol. 32, No. 6, Nov. 2017 (Year: 2017).*

International Application No. PCT/US2019/068842, International Search Report and Written Opinion dated Apr. 1, 2020.

International Application No. PCT/US2020/067578 International Search Report and Written Opinion dated Mar. 30, 2021.

Canizo, Mikel et al. "Real-time Predictive Maintenance for Wind Turbines Using Big Data Frameworks," arXiv: 1709.07250, Sep. 2017.

Zhao, Yingying et al. "Fault Prediction and Diagnosis of Wind Turbine Generators Using SCADA Data," Energies, vol. 10, No. 8, Aug. 2017.

European Patent Application No. 19903834.0, Search Report dated Aug. 26, 2022, 9 pages.

* cited by examiner

EVENT LOG EXAMPLE

| TURBINEID | EVENTCODENUMBER | TURBINEEVENTTYPE | EVENTSTARTUTC | EVENTSTOPEDUTC | DESCRIPTION | TURBINEEVENTID | PARAM1 | PARAM2 |
|---|---|---|---|---|---|---|---|---|
| 30367 | 265 | 0 | 11/30/17 23:11 | 12/1/17 00:11 | WIND:7.6 M/S GEN: 1560.4 RPM | 8857407920 | 76 | 15604 |
| 30367 | 266 | 0 | 11/30/17 23:11 | 12/1/17 00:11 | PITCH:-2.1 ∞ POWER:672.3 kW | 8857407921 | -21 | 6723 |
| 30367 | 442 | 0 | 11/30/17 23:28 | 12/1/17 00:28 | REMOTE POWER SETPOINT 2000kW | 8858033305 | 2000 | 0 |
| 30367 | 115 | 0 | 11/30/17 23:31 | 12/1/17 00:31 | GENERATOR 1 OUT | 8857882705 | 1 | 0 |

FIG. 7A

EVENT META DATA EXAMPLE

| EVENTDESCRIPTION | EVENTCODE |
|---|---|
| CAPTEST CAPACITOR DETERIORATION | 434 |
| ELEC PWRFLUCTUATIONS | 432 |
| PITCH EXTERNSAFETYRUN INPUT HIGH TS5 ERROR | 430 |
| PITCHANGLE DIFFERENCESTOP | 412 |
| SFS TEMPERATURE ERROR STOP | 372 |
| SFS CROWBARCURRENT LIMITEXCEEDED STOP | 371 |

FIG. 7B

* The curvature analysis can be done for all the performance metrics

```
Experiment:
    wind_turbine_model: 'V90'
    wind_turbine_mks: ['5', '8', '9']
    countries: ['Canada', "United States"]
    coverage_assetids: []
    component: 'gen'
    obs_window: 30
    lookahead_window: 7
    pred_window: 1
Features:
    parameters: ['active_pwr-avr.na.10m.10m',
                 'available_pwr-avg.na.10m.10m,
                 'bus-emp-avg.na.10m.10m',       # new
                 'cosphi-avg.na.10m.10m',
                 'ctrl-nacl-temp-avg.na.10m.10m',
                 'frequency-avg.na.10m.10m',
                 'gen-bear-pos2_temp-avg.na.10m.10m',  # new
                 'gen-bear-temp-avg.na.10m.10m',
                 'gen-cooling-water-avg.na.10m.10m',   # new
                 'gen-mod1-ph1_temp-avg.na.10m.10m',
                 'gen-mod1-ph2_temp-avg.na.10m.10m',
                 'gen-mod1-ph3_temp-avg.na.10m.10m',
                 'gen-rot-ph1_temp-avg.na.10m.10m',    # new
                 'gen-rot-ph2_temp-avg.na.10m.10m',    # new
                 'gen-rot-ph3_temp-avg.na.10m.10m',    # new
                 'gen-rpm-avg.na.10m.10m',
                 'gen-slipring-temp-avg.na.10m.10m',   # new
                 'Inv-ph1_temp-avg.na.10m.10m',        # new
                 'ph1_amp-avg.na.10m.10m',
                 'ph1_volt-avg.na.10m.10m',
                 'ph2_amp-avg.na.10m.10m',
                 'ph2_volt-avg.na.10m.10m',
                 'ph3_amp-avg.na.10m.10m',
                 'ph3_volt-avg.na.10m.10m',
                 'prod_active_pwr-avg.na.10m.10m',
                 'prod_react_prw-avg.na.10m.10m',
                 'react_pwr-avg.na.10m.10m',
                 'temp-avg.na.10m.10m',
                 'wind_dir-avg.na.10m.10m',            # new
                 'wind_speed-avg.na.10m.10m']
    agg_methods: [obs_avg, obs_std, 7d_avg, 7d_std, 1d_skew, 1d_trend, 1d_avg]
    trans_methods:
        divide:
        - - 'gen-bear-temp-avg.na.10m.10m'
          | - 'active_pwr-avg.na.10m.10m'
        - - 'gen-slipring-temp-avg.na.10m.10m'
          | - 'active_pwr-avg.na.10m.10m'
        - - 'gen-bear-temp-avg.na.10m.10m'
          | - 'temp-avg.na.10m.10m'
        - - 'gen-slipring-temp-avg.na.10m.10m'
          | - 'temp-avg.na.10m.10m'
        gradient: 1
```

FIG. 13

```
Experiment:
    wind_turbine_model: 'V90'
    wind_turbine_mks: ['5', '8', '9']
    countries: ['Canada', "United States"]
    coverage_assetids: []
    component: 'gen'
    obs_window: 30
    lookahead_window: 7
    pred_window: 1
Features:
    parameters: ['active_pwr-avr.na.10m.10m',
                 'available_pwr-avg.na.10m.10m,
                 'ctrl-nacl-temp-avg.na.10m.10m',
                 'gbx-bear-temp-avg.na.10m.10m', #
                 'gbx-finefilt-press-avg.na.10m.10m',
                 'gbx-oilflow-press-avg.na.10m.10m',
                 'gbx-oil_temp-avg.na.10m.10m',      #
                 'gbx-pump-cnt_opr-tot.na.10m.10m',
                 'gbx-roughfilt-press-avg.na.10m.10m',
                 'prod_active_pwr-avg.na.10m.10m',
                 'prod_react_prw-avg.na.10m.10m',
                 'react_pwr-avg.na.10m.10m',
                 'temp-avg.na.10m.10m',
                 'wind_speed-avg.na.10m.10m'
                ]
agg_methods: [obs_avg, obs_std, 7d_avg, 7d_std, 1d_skew, 1d_trend, 1d_avg]
trans_methods:
    divide:
    - - 'gbx-bear-temp-avg.na.10m.10m'
    | - 'active_pwr-avg.na.10m.10m'
    - - 'gbx-bear-temp-avg.na.10m.10m'
    | - 'temp-avg.na.10m.10m'
    - - 'gbx-oil_temp-avg.na.10m.10m'
    | - 'active_pwr-avg.na.10m.10m'
    - - 'gbx-oil-temp-avg.na.10m.10m'
    | - 'temp-avg.na.10m.10m'
    gradient: 2    # meaning 1st and 2nd gradients.
```

FIG. 14

```
Experiment:
  wind_turbine_model: 'V90'
  wind_turbine_mks: ['5', '8', '9']
  countries: ['Canada', "United States"]
  coverage_assetids: []
  component: 'gbx'
  obs_window: 30
  lookahead_window: 7
  pred_window: 1
  optimizing_measure: auc Training:
  start_time: '2017-01-01'
  end_time: '2017-06-30'
  case_control_ratio: 1
  self_control_ratio: 0.5
  failure_id_dates: [
       ['337667', '2017-05-20 08:00:00', '2017-05-21 09:00:00'],
       ['340753', '2017-04-27 17:50:00', '2017-04-28 17:20:00']]
  self_control_dates: [
       ['337667', '2017-04-27'],
       ['340753', '2017-03-31']]
  healthy_ids: [
       '330099',
       '337656',
       '337658'
       ]
```

| EventDescription | EventCode | fid |
|---|---|---|
| Temp ControlPanel LowStop | 193 | 190 |
| Elec VoltageU1 HighStop | 194 | 191 |
| Elec VoltageU2 HighStop | 195 | 192 |
| Elec VoltageU3 HighStop | 196 | 193 |
| Elec VoltageU1 LowStop | 197 | 194 |
| Elec VoltageU2 LowStop | 198 | 195 |
| Elec VoltageU3 LowStop | 199 | 196 |
| Elec ParkControlActive | 201 | 197 |

FIG. 17

| Record ID | fid 0 | ... | fid 190 | fid 191 | ... |
|---|---|---|---|---|---|
| ... | | | | | |
| 28 | 3000 | | 29450 | 1234 | |
| 29 | 2401 | | 15000 | 2930 | |
| ... | | | | | |

SCALABLE SYSTEM AND ENGINE FOR FORECASTING WIND TURBINE FAILURE

CROSS-REFERENCE TO RELATED APPLICATIONS

This application is a continuation of U.S. patent application Ser. No. 16/234,455, filed on Dec. 27, 2018 and entitled "SCALABLE SYSTEM AND ENGINE FOR FORECASTING WIND TURBINE FAILURE", which is incorporated herein by reference in its entirety.

FIELD OF THE INVENTION

Embodiments of the present invention(s) relate generally to forecasting failure of renewable energy assets and, in particular, evaluating models to predict failures of one or more renewable energy assets to increase lead time before failure and improve accuracy utilizing a centralized system for model creation and application.

DESCRIPTION OF RELATED ART

Detection and prediction of failure in one or more components of an asset of an electrical network has been difficult. Detection of a failure of a component of an asset is tedious and high in errors. In this example, an asset is a device for generating or distributing power in an electrical network. Examples of assets can include, but is not limited to, a wind turbine, solar panel power generator, converter, transformer, distributor, and/or the like. Given that detection of a failure of a component of an asset may be difficult to determine, increased accuracy of prediction of future failures compounds problems.

SUMMARY

An example nontransitory computer readable medium comprises executable instructions. The executable instructions are executable by one or more processors to perform a method, the method comprising: receiving by a model selection pipeline of a component failure prediction system, event and alarm data from event logs of one or more SCADA systems that monitor any number of wind turbines, the event and alarm data being generated during a first period of time, receiving by the model selection pipeline, historical wind turbine component failure data and wind turbine asset data from the one or more SCADA systems during the first period of time, creating by the model selection pipeline, cohort instances based on the wind turbine failure data and wind turbine asset data, each cohort representing a subset of the wind turbines, the subset of the wind turbines including a same type of controller and a similar geographical location, the geographical location of the wind turbines of the subset of wind turbines being within the wind turbine asset data, generating by the model selection pipeline, an event and alarm vendor agnostic representation of the event and alarm data creating a feature matrix, wherein the feature matrix includes a unique feature identifier for each feature of the event and alarm data and one or more features from the event and alarm data, extracting by the model selection pipeline, patterns of events based on the feature matrix. receiving by a model training and testing pipeline of the component failure prediction system, first historical sensor data of the first time period, the first historical sensor data including sensor data from one or more sensors of one or more components of the any number of renewable energy assets, the first historical sensor data indicating at least one first failure associated with the one or more components of the renewable energy asset during the first time period, generating by the model training and testing pipeline, a first set of failure prediction models using the first historical sensor data and the patterns of events, each of the first set of failure prediction models being trained using different amounts of first historical sensor data based on different observation time windows and different lead time windows, each observation time window including a time period during which first historical data is generated, the lead time window including a period of time before a predicted failure, evaluating by the model training and testing pipeline, each of the first set of failure prediction models using at least a confusion matrix including metrics for true positives, false positives, true negatives, and false negatives as well as a positive prediction value, comparing by the model training and testing pipeline, the confusion matrix and the positive prediction value of each of the first set of failure prediction models, selecting by the model training and testing pipeline, at least one failure prediction model of the first set of failure prediction models based on the comparison of the confusion matrixes, the positive prediction values, and the lead time windows to create a first selected failure prediction model, the first selected failure prediction model including the lead time window before a predicted failure, receiving by a model scoring pipeline of the component failure prediction system, first current sensor data of a second time period, the first current sensor data including sensor data from the one or more sensors of the one or more components of the renewable energy asset, applying by the model scoring pipeline, the first selected failure prediction model to the current sensor data to generate a first failure prediction a failure of at least one component of the one or more components, comparing by the model scoring pipeline, the first failure prediction to a trigger criteria, and generating and transmitting by the model scoring pipeline, a first alert based on the comparison of the failure prediction to the trigger criteria, the alert indicating the at least one component of the one or more components and information regarding the failure prediction.

In some embodiments, the method further comprises cleaning of the event and alarm data from the event logs, the cleaning comprising discarding event data missing expected information. Extracting patterns of events based on the feature matrix may comprise counting a number of event codes of events that occurred during a time interval using the feature matrix and sequence the event codes to include dynamics of events in a longitudinal time dimension. The time interval may be the time period, the first historical sensor data being generated by the one or more sensors during the time period. Events of the patterns of events may occur during the time period. The renewable energy asset may be a wind turbine. The first historical sensor data may be the historical wind turbine component failure data.

The method may further comprise retrieving the trigger criteria from a datastore including a plurality of trigger criteria, the trigger criteria being retrieved based at least in part on the at least one component of the one or more components. In some embodiments, the method further comprises receiving operational signals from the one or more SCADA systems and extracting features from the operational signals, wherein generating the first set of failure prediction models uses the first historical sensor data, the patterns of events, and extracted features rom the operational signals.

An example system may comprise at least one processor and memory containing instructions, the instructions being executable by the at least one processor to: receive by a model selection pipeline of a component failure prediction system, event and alarm data from event logs of one or more SCADA systems that monitor any number of wind turbines, the event and alarm data being generated during a first period of time, receive by the model selection pipeline, historical wind turbine component failure data and wind turbine asset data from the one or more SCADA systems during the first period of time, create by the model selection pipeline, cohort instances based on the wind turbine failure data and wind turbine asset data, each cohort representing a subset of the wind turbines, for example, but not limited to, the subset of the wind turbines including a same type of controller and a similar geographical location, the geographical location of the wind turbines of the subset of wind turbines being within the wind turbine asset data, generate by the model selection pipeline, an event and alarm vendor agnostic representation of the event and alarm data creating a feature matrix, wherein the feature matrix includes a unique feature identifier for each feature of the event and alarm data and one or more features from the event and alarm data, extract by the model selection pipeline, patterns of events based on the feature matrix, receive by the model selection pipeline, first historical sensor data of the first time period, the first historical sensor data including sensor data from one or more sensors of one or more components of the any number of renewable energy assets, the first historical sensor data indicating at least one first failure associated with the one or more components of the renewable energy asset during the first time period, generate by the model selection pipeline, a first set of failure prediction models using the first historical sensor data and the patterns of events, each of the first set of failure prediction models being trained using different amounts of first historical sensor data based on different observation time windows and different lead time windows, each observation time window including a time period during which first historical data is generated, the lead time window including a period of time before a predicted failure, evaluate each of the first set of failure prediction models using at least a confusion matrix including metrics for true positives, false positives, true negatives, and false negatives as well as a positive prediction value, compare by the model selection pipeline, the confusion matrix and the positive prediction value of each of the first set of failure prediction models, select at least one failure prediction model of the first set of failure prediction models based on the comparison of the confusion matrixes, the positive prediction values, and the lead time windows to create a first selected failure prediction model, the first selected failure prediction model including the lead time window before a predicted failure, receive by a model scoring pipeline of the component failure prediction system, first current sensor data of a second time period, the first current sensor data including sensor data from the one or more sensors of the one or more components of the renewable energy asset, apply by the model scoring pipeline, the first selected failure prediction model to the current sensor data to generate a first failure prediction a failure of at least one component of the one or more components, compare by the model scoring pipeline, the first failure prediction to a trigger criteria, and generate and transmitting by the model scoring pipeline, a first alert based on the comparison of the failure prediction to the trigger criteria, the alert indicating the at least one component of the one or more components and information regarding the failure prediction.

An example method comprises receiving by a model selection pipeline of a component failure prediction system, event and alarm data from event logs of one or more SCADA systems that monitor any number of wind turbines, the event and alarm data being generated during a first period of time, receiving by the model selection pipeline, historical wind turbine component failure data and wind turbine asset data from the one or more SCADA systems during the first period of time, creating by the model selection pipeline, cohort instances based on the wind turbine failure data and wind turbine asset data, each cohort representing a subset of the wind turbines, for example, but not limited to, the subset of the wind turbines including a same type of controller and a similar geographical location, the geographical location of the wind turbines of the subset of wind turbines being within the wind turbine asset data, generating by the model selection pipeline, an event and alarm vendor agnostic representation of the event and alarm data creating a feature matrix, wherein the feature matrix includes a unique feature identifier for each feature of the event and alarm data and one or more features from the event and alarm data, extracting by the model selection pipeline, patterns of events based on the feature matrix. receiving by a model training and testing pipeline of the component failure prediction system, first historical sensor data of the first time period, the first historical sensor data including sensor data from one or more sensors of one or more components of the any number of renewable energy assets, the first historical sensor data indicating at least one first failure associated with the one or more components of the renewable energy asset during the first time period, generating by the model training and testing pipeline, a first set of failure prediction models using the first historical sensor data and the patterns of events, each of the first set of failure prediction models being trained using different amounts of first historical sensor data based on different observation time windows and different lead time windows, each observation time window including a time period during which first historical data is generated, the lead time window including a period of time before a predicted failure, evaluating by the model training and testing pipeline, each of the first set of failure prediction models using at least a confusion matrix including metrics for true positives, false positives, true negatives, and false negatives as well as a positive prediction value, comparing by the model training and testing pipeline, the confusion matrix and the positive prediction value of each of the first set of failure prediction models, selecting by the model training and testing pipeline, at least one failure prediction model of the first set of failure prediction models based on the comparison of the confusion matrixes, the positive prediction values, and the lead time windows to create a first selected failure prediction model, the first selected failure prediction model including the lead time window before a predicted failure, receiving by a model scoring pipeline of the component failure prediction system, first current sensor data of a second time period, the first current sensor data including sensor data from the one or more sensors of the one or more components of the renewable energy asset, applying by the model scoring pipeline, the first selected failure prediction model to the current sensor data to generate a first failure prediction a failure of at least one component of the one or more components, comparing by the model scoring pipeline, the first failure prediction to a trigger criteria, and generating and transmitting by the model scoring pipeline, a first alert based on the comparison of the failure prediction to the trigger criteria, the alert indicating the at least one component of the one or more components and information regarding the failure prediction.

BRIEF DESCRIPTION OF THE DRAWINGS

FIG. 7*a* depicts an example event log.

FIG. 7*b* depicts example alarm metadata.

FIG. 13 depicts example configuration information that may be received by the user/developer input for a generator failure.

FIG. 14 depicts example configuration information for a gearbox failure whereby parameters are highlighted.

FIG. 15 depicts an example of customization enabled by providing configuration information for model selection, training, testing, and scoring.

FIG. 17 depicts an example feature matrix generated by the data extraction module 506 in some embodiments.

FIG. 18 depicts an example longitudinal pattern extraction matrix that identifies for each instance identifier a number that each unique feature identifier occurs in a period of time.

FIG. 19 depicts example patterns that represent longitudinal patterns by distinct event sequences.

DETAILED DESCRIPTION

In the renewable energy industry, it is crucial to accurately forecast component failures with as much lead time as possible. Some embodiments described herein utilize machine learning algorithms to build a sophisticated forecasting model based on multi-variate sensor data to forecast component failures. There is typically a trade-off between accuracy of the forecast of component failure and the length of time forecasted (e.g., the predicted length of time) before the failure occurs. As a result, there is a need to generate multiple models for evaluation and standardize evaluation in order to obtain models that accurately predict failure at an acceptable length of time prior to the predicted failure.

Model generation can be separated by processes for selection, training, testing, and scoring. In the artificial intelligence industry, these processes are separate and are performed by separate machines and separate processes. As a result, there is an increased need for disparate systems to communicate, trade information in a timely manner, store information, and validate information between the processes. The different systems and extra overhead needed to orchestrate these systems creates computational efficiencies, computational burden, energy consumption, and wasted time. Further, these components and overhead form a firm limit on the scalability.

Moreover, these existing prior art systems to generate models is slow and therefore reduces the amount and quality of failure prediction of renewable energy assets. Given that these models predict failure of assets involved in energy generation for industry as well as populations, these prior art systems impact productivity, infrastructure, legacy electrical systems, and, in some cases, the lives of people being served (e.g., in a hospital receiving critical care or the elderly, particularly in a heat wave or cold conditions).

Various embodiments described herein overcome limitations of the prior art and may provide scalability, proactive warnings, and/or computational efficiency while providing improved accuracy with a centralized system for performing model, selection, training, testing, and scoring.

Figure 1:
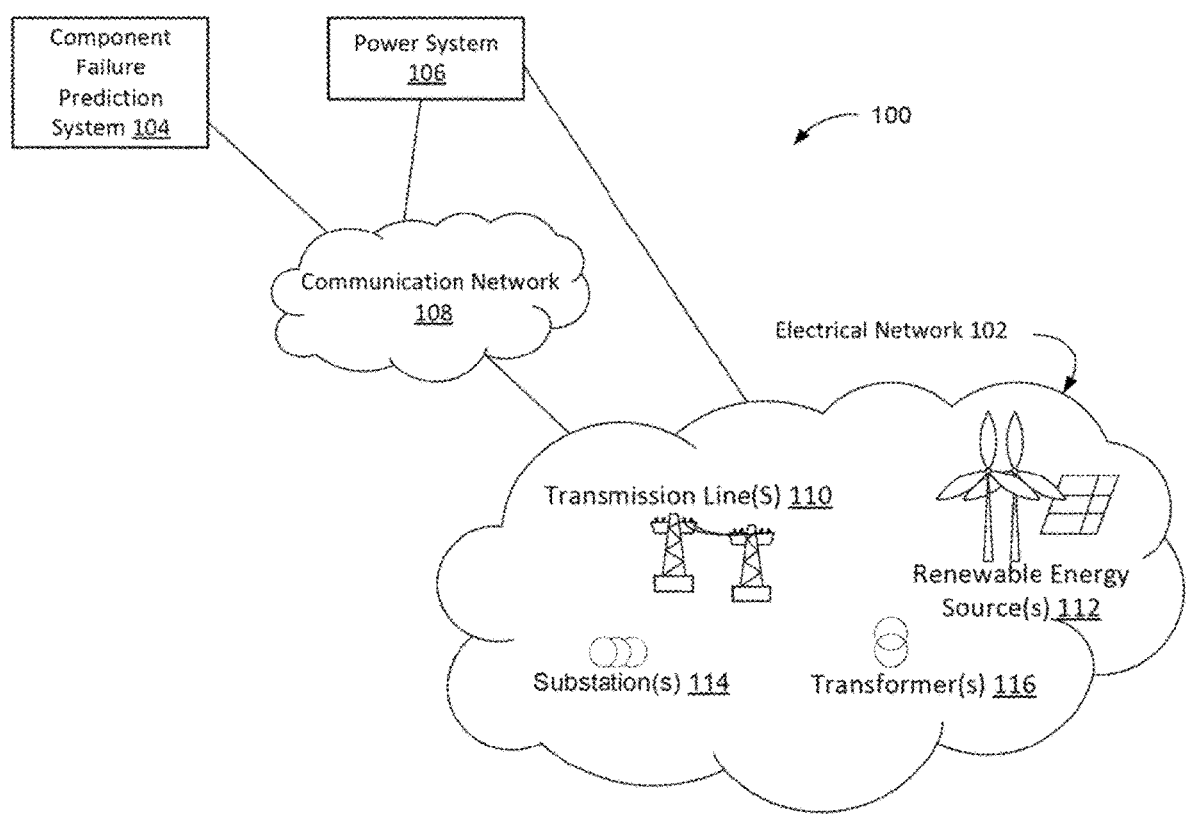
FIG. 1 depicts a block diagram of an example of an electrical network in some embodiments.

FIG. 1 depicts a block diagram 100 of an example of an electrical network 100 in some embodiments. FIG. 1 includes an electrical network 102, a component failure prediction system 104, a power system 106, in communication over a communication network 108. The electrical network 102 includes any number of transmission lines 110, renewable energy sources 112, substations 114, and transformers 116. The electrical network 102 may include any number of electrical assets including protective assets (e.g., relays or other circuits to protect one or more assets), transmission assets (e.g., lines, or devices for delivering or receiving power), and/or loads (e.g., residential houses, commercial businesses, and/or the like).

Components of the electrical network 102 such as the transmission line(s) 110, the renewable energy source(s) 112, substation(s) 114, and/or transformer(s) 106 may inject energy or power (or assist in the injection of energy or power) into the electrical network 102. Each component of the electrical network 102 may be represented by any number of nodes in a network representation of the electrical network. Renewable energy sources 112 may include solar panels, wind turbines, and/or other forms of so called "green energy." The electrical network 102 may include a wide electrical network grid (e.g., with 40,000 assets or more).

Each electrical asset of the electrical network 100 may represent one or more elements of their respective assets. For example, the transformer(s) 116, as shown in FIG. 1 may represent any number of transformers which make up electrical network 100.

In some embodiments, the component failure prediction system 104 may be configured to receive historical sensor data from any number of sensors of any number of electrical assets. The component failure prediction system 104 may subsequently generate any number of models to predict failures of any number of components. Different models for the same component(s) may be generated based on a common set of metrics.

Each model may be evaluated to determine accuracy of the model and the length of time prior to predicted failure at the desired level of accuracy. As such, the component failure prediction system 104 may be used to generate and evaluate multiple models using the same historical sensor data but each with different lengths of time prior to predicted failure in order to identify at least one model with an acceptable accuracy at an acceptable prediction time before component failure is expected to occur.

In some embodiments, communication network 108 represents one or more computer networks (e.g., LAN, WAN, and/or the like). Communication network 108 may provide communication between any of the component failure prediction system 104, the power system 106, and/or the electrical network 102. In some implementations, communication network 108 comprises computer devices, routers, cables, uses, and/or other network topologies. In some embodiments, communication network 108 may be wired and/or wireless. In various embodiments, communication network 108 may comprise the Internet, one or more networks that may be public, private, IP-based, non-IP based, and so forth.

The component failure prediction system 104 may include any number of digital devices configured to forecast component failure of any number of components and/or generators (e.g., wind turbine or solar power generator) of the renewable energy sources 112. The component failure prediction system 104 selects, trains, tests, and scores failure prediction models for components and groups of components of renewable energy assets (e.g., renewable energy source(s) 112).

In various embodiments, the component failure prediction system 104 utilizes a centralized system to enable model selection, model training and testing, and model scoring. By centralizing the system, duplication of services, validation, and synchronization (or orchestration) between different systems is reduced which reduces computational burden, allows for significant scalability, and improves time to generate failure prediction models. It will be appreciated that if there are numerous models for numerous components of any number of renewable energy assets, the generation of failure prediction models in a timely manner (using recent data to improve accuracy) in a scalable system may be critical. The component failure prediction system 104 is further discussed in FIG. 5.

The power system 106 may include any number of digital devices configured to control distribution and/or transmission of energy. The power system 106 may, in one example, be controlled by a power company, utility, and/or the like. A digital device is any device with at least one processor and memory. Examples of systems, environments, and/or configurations that may be suitable for use with system include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

A computer system may be described in the general context of computer system executable instructions, such as program modules, being executed by a computer system. Generally, program modules may include routines, programs, objects, components, logic, data structures, and so on that perform particular tasks or implement particular abstract data types. A digital device, such as a computer system, is further described with regard to FIG. 24.

Figure 2:
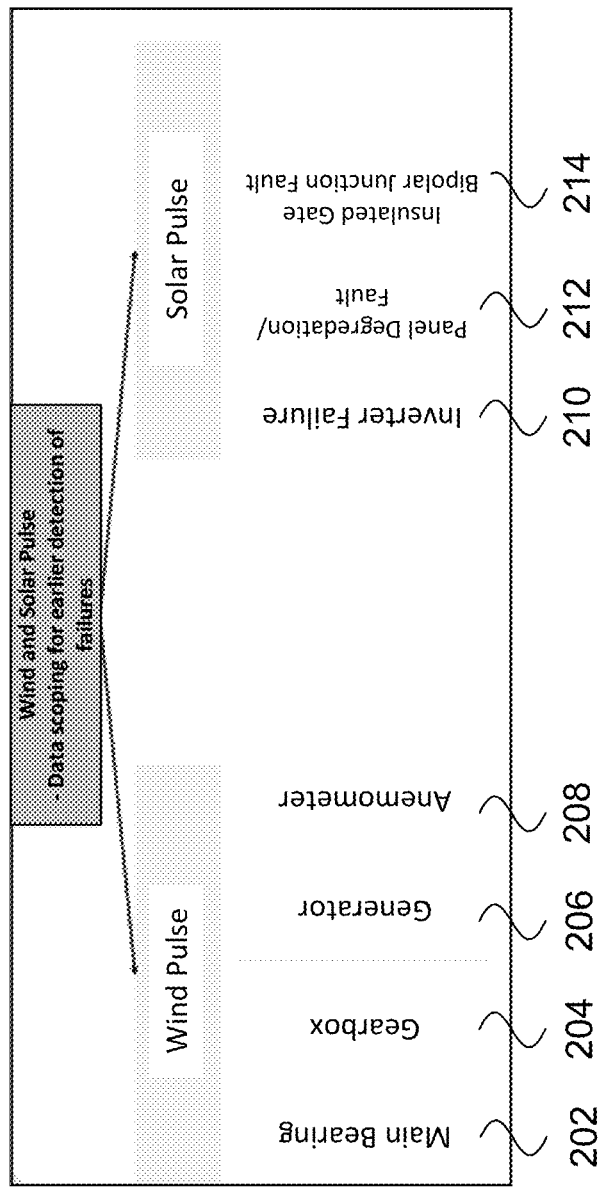
FIG. 2 depicts components that often produce failures of wind turbines and components that often produce failures in solar panel generators.

FIG. 2 depicts components that often produce failures of wind turbines and components that often produce failures in solar panel generators. Failures in wind turbines often occur as a result of failures in a main bearing 202, gearbox 204, generator 206, or anemometer 208. Failures in solar panel generators often occur as a result of failures in an inverter 210, panel degradation 212, and an IGBT 214.

A wind turbine has many potential components of failure. Different sensors may provide different readings for one or more different components or combinations of components. Given the number of wind turbines in a wind farm, the amount of data to be assessed may be untenable using prior art methods. For example, data analytics systems of the prior art do not scale, sensors provide too much data to be assessed by the prior art systems, and there is a lack of computational capacity in prior art systems to effectively assess data from wind farms in a time sensitive manner. As a result, prior art systems are reactive to existing failures rather than proactively providing reports or warnings of potential future failure of one or more components.

For example, various embodiments regarding a wind turbine described herein may identify potential failure of a main bearing 202, gearbox 204, generator 206, or anemometer 208 of one or more wind turbines. Although many bearings may be utilized in a wind turbine (e.g., yaw and pitch bearings), the main shaft and gearbox of the wind turbine tend to be the most problematic. For example, a main bearing 202 may fail due to high thrust load or may fail due to inadequate lubricant film generation. Trends in redesign of a main shaft 202 and/or gearbox 204 of a single wind turbine have been driven by unexpected failures in these units. The unplanned replacement of main-shaft bearing 202 can cost operators up to $450,000 and have an obvious impact on financial performance.

Gearbox 204 failures are one of the largest sources of unplanned maintenance costs. Gearbox 204 failures can be caused by design issues, manufacturing defects, deficiencies in the lubricant, excessive time at standstill, high loading, and other reasons. There may be many different modes of gearbox 204 failure and, as such, it may be important to identify the type of failure mode in addressing the failure. One mode is micropitting which occurs when lubricant film between contacting surfaces in a gearbox 204 is not thick enough. Macropitting occurs when contact stress in a gear or breaking exceeds the fatigue strength of the material. Bending fatigue a failure mode that affects gear teeth and axial cracking may occur in bearings of a gearbox; the cracks develop in the axial direction, perpendicular to the direction of rolling.

The generator 206 typically converts the wind energy to electrical energy. Failures often occur in bearings, stator, rotor, or the like which can lead to inconsistent voltage to total failure. Generator 206 failure may be difficult to detect as a result of inconsistent weather, lack of motion, and/or partial failure of the anemometer 208.

The anemometer 208 uses moving parts as sensors. Anemometers 208 often include "cups" for wind speed measurements and a wind vane that uses a "vane tail" for measuring vector change, or wind direction. Freezing weather has caused the "cups" and "vane tail" to lock. If an anemometer 208 under-reports wind speed because of a partial failure, there is an increase in rotor acceleration that indicates a large amount of wind energy is not converted into electrical engineering. Rolling resistance in an anemometer 208 bearings typically increase over time until they seize. Further, if the anemometer 208 is not accurate, the wind turbine will not control blade pitch and rotor speed as needed. Poor or inaccurate measurements by the anemometer 208 will lead to incorrect adjustments and increased fatigue.

Similarly, various embodiments regarding a solar panel generator described herein may identify potential failure of a inverter 210, solar panel 212, and IGBT 214 in one or more solar panels of a solar farm.

A solar inverter 210 is an electrical converter to convert variable direct current from a photovoltaic solar panel 212 into a utility frequency alternating current that can be fed to an electrical grid. Production loses are often attributable to poor performance of inverters 210. Solar inventers 210 may overheat (caused by weather, use, or failure of cooling systems) which can reduce production. Moisture may cause a short circuit which can cause complete or partial failure (e.g., to a minimum "required" isolation level). Further, failure of the solar inverter 210 to restart after gird fault may require manual restarting of the equipment.

The panel 212 refers to the solar or photovoltaic panel. The photovoltaic panel 212 may degrade due to weather, poor cleaning, thermal cycling, damp heat, humidity freezing, and UV exposure. Thermal cycling can cause solder bond failures and cracks. Damp heat has been associated with delamination of encapsulants and corrosion of cells. Humidity freezing can cause junction box adhesion to fail. UV exposure contributes to discoloration and backsheet degradation.

Solar inverters 210 often use insulated gate bipolar transistors (IGBT) 214 for conversion of solar panel 212 output to AC voltage. Failures in the IGBT 214 can be caused by fatigue, corrosion of metallizations, electromigration of metalizations, conductive filament formation, stress driven diffusion voiding, and time dependent dielectric breakdown.

Figure 3:
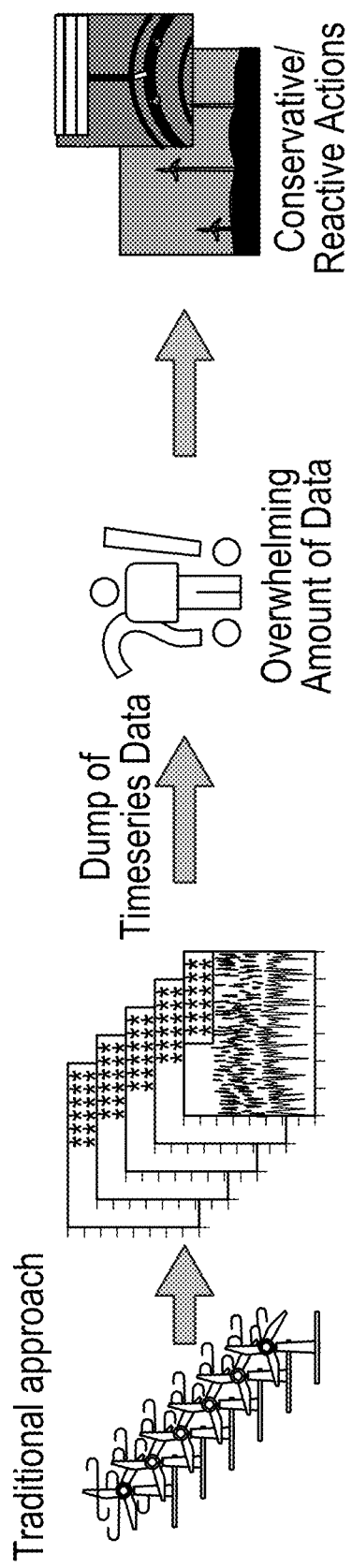
FIG. 3 depicts a common problem of detecting possible failure of one or more components of a wind farm.

FIG. 3 depicts a common problem of detecting possible failure of one or more components of a wind farm. As shown in FIG. 3, there may be any number of wind turbines in a wind farm. Sensors of each wind turbine in a wind farm may generate its own data. As a result, there is a dump of timeseries data which is overwhelming for prior art systems and prior art methods of assessment. As illustrated, monitoring hundreds of assets with hundreds of sensor inputs is time-consuming and overwhelming for operators to test. As a further consequence, evaluating different models for different components to predict failure in those components becomes difficult and accuracy can suffer as the desired time to predict component failure increases.

Existing prior art systems receive too much timeseries data to be effectively assessed in a scalable and/or computationally efficient manner. As a result, there is a conservative and or reactive response to component and wind turbine failure. In other words, action is typically taken well after failure is detected or when failure is both immanent and unmistakable.

Figure 4:
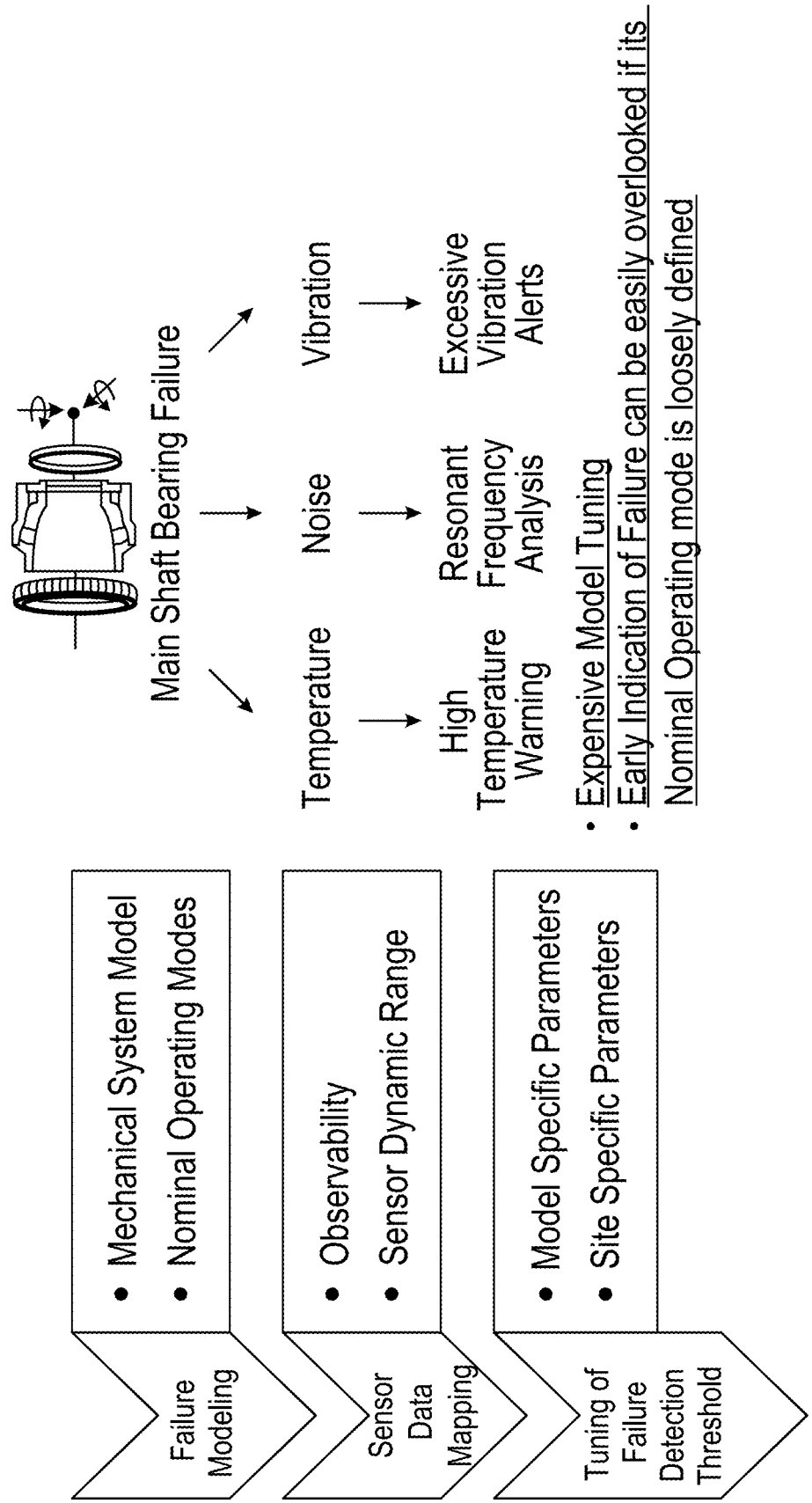
FIG. 4 depicts traditional failure prediction approaches of main shaft bearing failure in wind turbines as well as challenges.

FIG. 4 depicts traditional failure prediction approaches of main shaft bearing failure in wind turbines as well as challenges. In this example, main shaft bearing failure may be caused by any number of components. For prior art analysis, challenges include identifying the correct mechanical systems model and nominal operating modes of that mechanical system model.

Prior art approaches may also fail due to incorrect sensor data mapping. Mapping of sensor data may be based on observability and take into account sensor dynamic range. In this example of the main shaft bearing failure, sensor data regarding temperature, noise, and/or vibration may be taken into account. For example, the sensor data related to temperature, noise, and/or vibration is observed against the background of other sensor data readings, and the sensor dynamic range of each individual sensor or combination of sensors should be recognized.

Prior art systems often fail in tuning a failure detection threshold for a sensor reading. Prior art systems typically must identify model specific parameters and site-specific parameters. In this case the temperature sensor data may indicate a high temperature warning relative to some high temperature threshold. The noise data may be utilized for resonant frequency analysis to detect residents within a component or device. The vibration data may be assessed to determine excessive vibration relative to some vibration threshold.

Further early indication of failures in temperature, noise, vibration, or other failures, can be easily overlooked if it's nominal operating mode is loosely defined by the prior art system.

Figure 5:
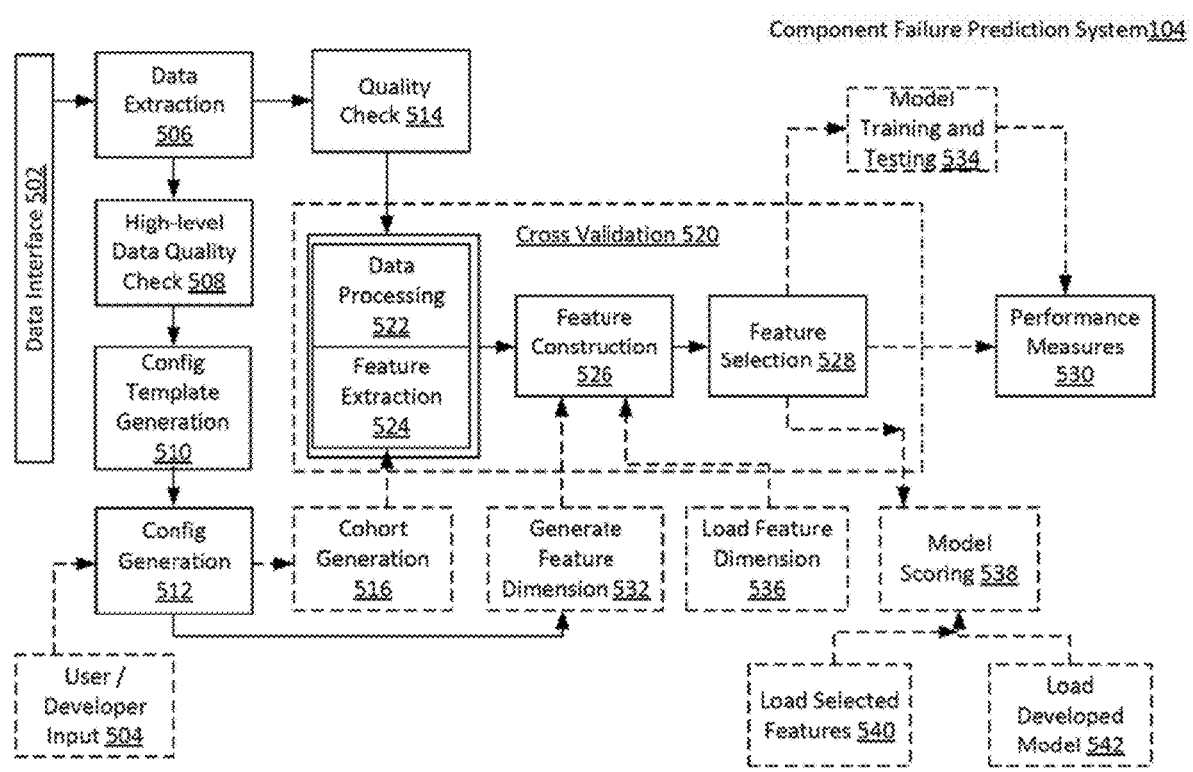
FIG. 5 is an example component failure prediction system in some embodiments.

FIG. 5 is an example component failure prediction system 104 in some embodiments. While wind turbines are used in names of modules and generally described herein, it will be appreciated that systems and methods utilized herein may generate any number of failure prediction models of components/groups of components for any device such as any renewable energy asset or electrical asset.

Dotted lines of modules and communication paths represent components and communication paths that change depending on the service to be performed (e.g., depending upon the pipeline). As discussed herein, a centralized system (e.g., the component failure prediction system 104) may be leveraged to perform model selection, model testing and training, and model scoring thereby improving computation efficiency, reducing overhead, avoidance of errors, improved accuracy, improved model delivery, and scalability (these limitations being created by the previous technological processes).

By centralizing functions and pipelines of the component failure prediction system 104, the component failure prediction system 104 may provide for different interfaces (e.g., API calls) that will allow the component failure prediction system 104 to receive different kinds of data and perform different functions (e.g., by directing the data to different components based on the pipeline). This may enable multiple renewable energy service providers, owners, maintenance workers, asset acquisition groups, municipalities, and the like to utilize the same component failure prediction system 104 thereby improving efficiency and reducing failure of critical components.

Centralizing functions and pipelines also allows for better function orchestration, storing information, leveraging information in different pipelines, and computational efficiency (all of which increase scalability of what is in the prior art).

Figure 6:
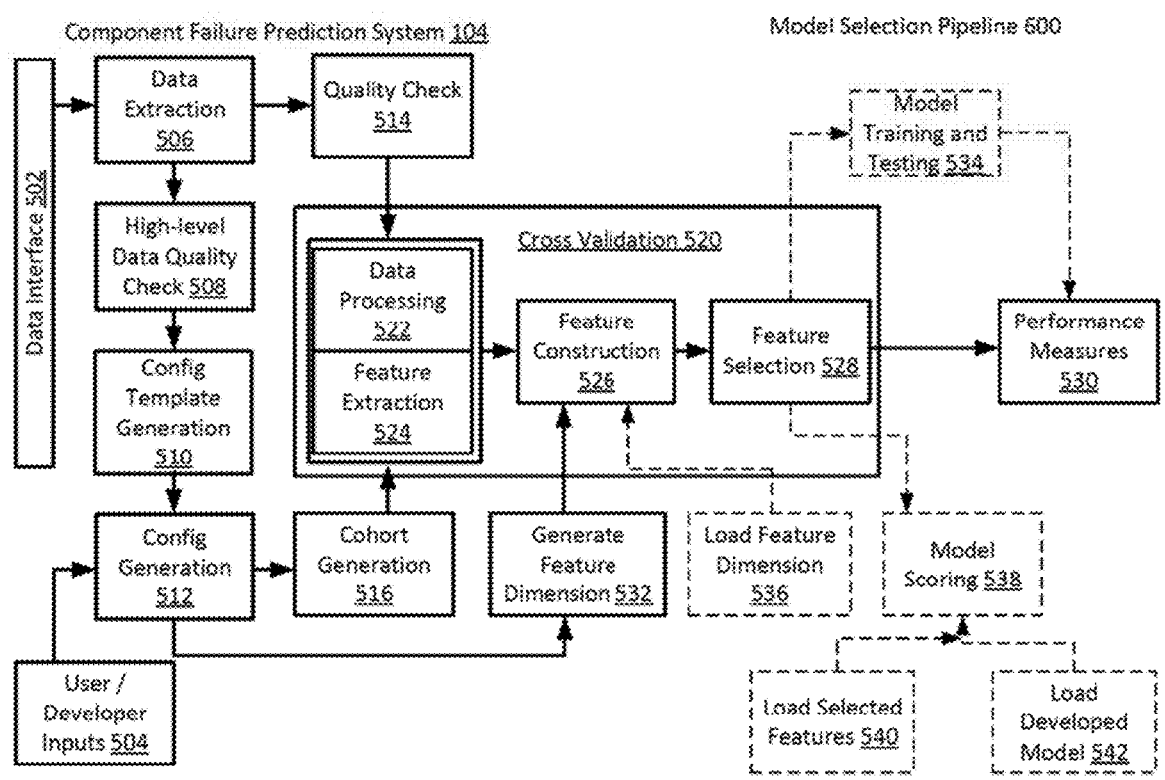
FIG. 6 is an example of the component failure prediction system utilizing a model selection pipeline in some embodiments.
Figure 20:
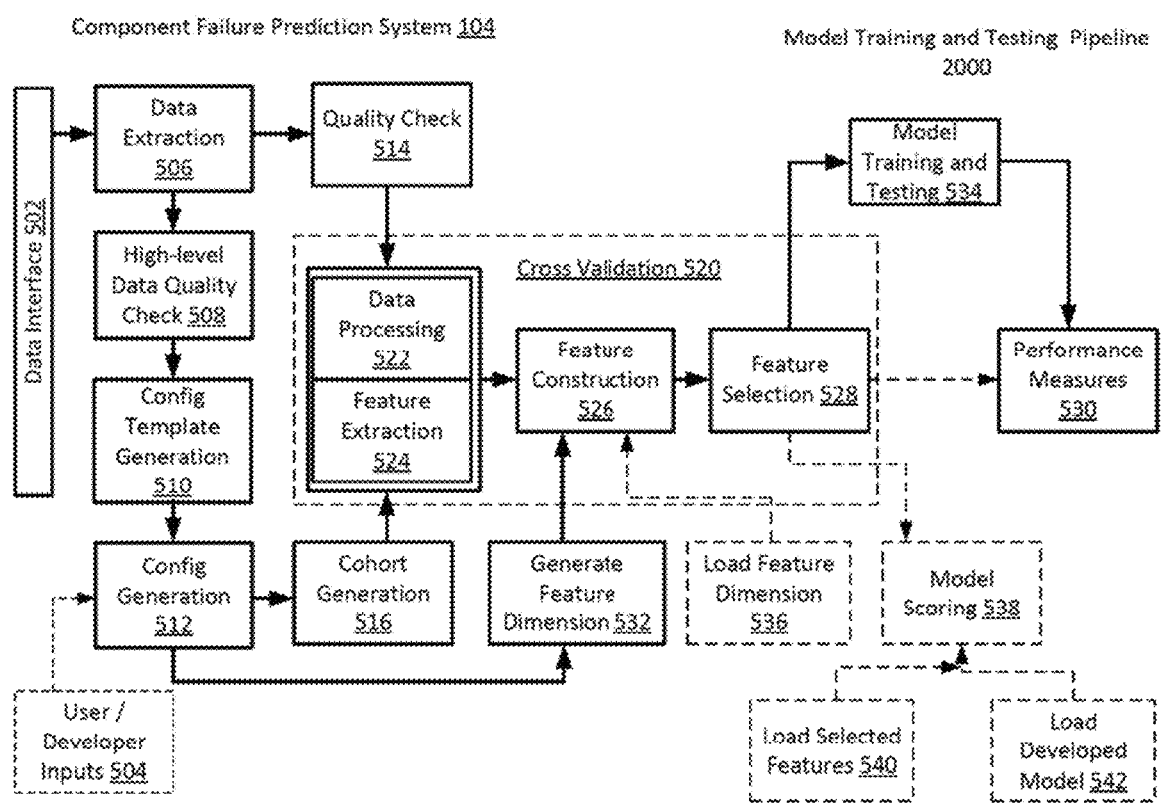
FIG. 20 is an example of the component failure prediction system utilizing a model training and testing pipeline in some embodiments.
Figure 22:
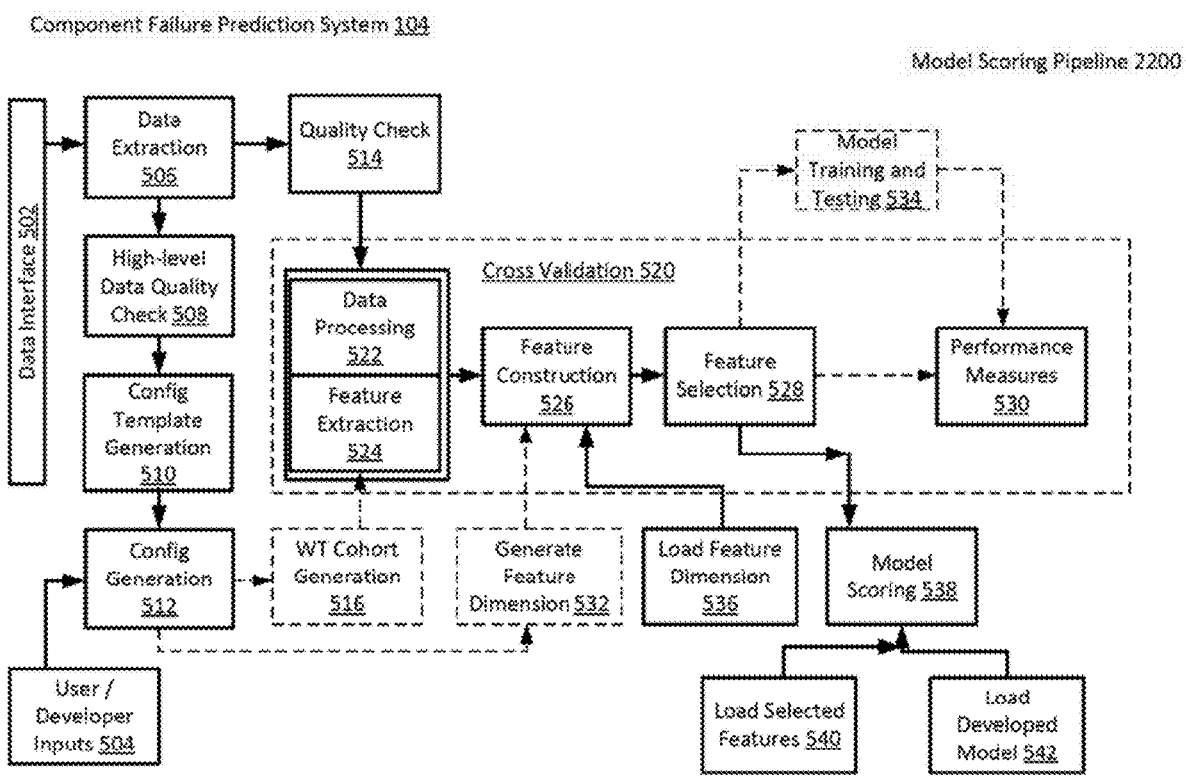
FIG. 22 is an example of the component failure prediction system utilizing a model scoring pipeline in some embodiments.

FIG. 6 is an example of the component failure prediction system 104 utilizing a model selection pipeline in some embodiments. FIG. 20 is an example of the component failure prediction system 104 utilizing a model training and testing pipeline in some embodiments. FIG. 22 is an example of the component failure prediction system 104 utilizing a model scoring pipeline in some embodiments.

The component failure prediction system 104 of FIG. 5 depicts a data interface 502, a user/developer input 504, a data extraction module 506, a high-level data quality check module 508, an exp. config template generation module 510, an config generation module 512, an quality check module 514, a cohort generation module 516, a cross-validation module 520, a generate feature dimension module 532, a model training and testing module 534, a load feature dimension module 536, the model scoring module 538, a load selected features module 540, and a load developed model module 542. The cross-validation module 520 includes a data processing module 522, a feature extraction module 524, a feature construction module 526, a feature selection module 528, and a performance measures module 530. A module may be hardware (e.g., circuitry and/or programmable chip), software, or a combination of hardware and software.

These different modules will be discussed in the context of FIGS. 6, 20, and 22.

FIG. 6 is an example of the component failure prediction system 104 utilizing a model selection pipeline 600 in some embodiments. The model selection pipeline may include cross-validation for assessing how the results of different models may generalize to an independent data set.

The model selection pipeline utilizes the data interface 502, the user/developer input 504, the data extraction module 506, the high-level data quality check module 508, the config template generation module 510, the config generation module 512, the quality check module 514, the cohort generation module 516, the cross-validation module 520, and the generate feature dimension module 532. The cross-validation module 520 includes the data processing module 522, the feature extraction module 524, the feature construction module 526, the feature selection module 528, and the performance measures module 530.

Information may be received by the component failure prediction system 104 through the data interface 502 and the user/developer input 504. The information may include, for example, SCADA information (discussed herein), historical sensor data, and parameters for model creation. While the data interface 502 and the user/developer input 504 are depicted as two separate modules, it will be appreciated that all information may be received by any number of modules (e.g., everything is received by the data interface 502).

Since the component failure prediction system 104 may include different pipelines for different functions, in some embodiments, different functions may be controlled or initiated based on information received by the data interface 502 and/or the user/developer input 504. For example, different commands may be issued and/or different APIs of the component failure prediction system 104 may be called to execute different functionality along different pipelines.

The component failure prediction system 104 may train a set of component failure prediction models for each component or set of components using historical sensor data received from sensors of any number of electrical assets (e.g., including renewable energy electrical assets such as wind turbines). In some embodiments, each set of models predicts failure of a different component of the same or different electrical assets.

The data interface 502 and/or the user/developer input 504 may be a part of a communication module configured to transmit and receive data between two or more modules in the component failure prediction system 104. In some embodiments, the/or user/developer input 504 is configured to receive information regarding assets of the electrical network 102 (e.g., from the power system 106, sensors within components of the electrical network 102 such as the renewable energy sources 112, third-party systems such as government entities, other utilities, and/or the like).

The data interface 502/or the user/developer input 504 may be configured to receive historical sensor data regarding electrical assets either individually or in combination (e.g., wind turbines, solar panels, windfarms, solar farms, components of devices, components of wind turbines, components of solar panels, substations 114, transformers 116, and/or transmission lines 110). The data interface 502/or the user/developer input 504 may further receive sensor data from one or more sensors of any number of electrical assets such as those described above. The historical sensor data may be generated by any number of sensors of any number of components, parts, or assets of renewable energy assets. The historical sensor data may be received by the data interface 502/or the user/developer input 504 directly from any number of sensors, from a power station, provider, and/or one or more SCADA system(s).

Supervisory control and Data Acquisition (SCADA) is a control system architecture often used to monitor and control aspects of hardware and software systems and networks. SCADA is one of the most commonly-used types of industrial control systems. SCADA may be used to provide remote access to a variety of local control modules which could be from different manufacturers which allows access through standard automation protocols. SCADA systems may be used to control large-scale processes at multiple sites and over large or small distances.

SCADA systems may be utilized for remote supervision and control of wind turbines and wind farms. For example, the SCADA system may enable control of any number of wind turbines in the wind farm (e.g., clusters of wind turbines, all wind turbines, or one wind turbine). The SCADA system may provide an overview of relevant parameters of each wind turbine including, for example, temperature, pitch angle, electrical parameters, rotor speed, yaw system, rotor velocity, azimuth angle, nacelle angle, and the like. The SCADA system may also allow remote access to the SCADA system to supervise and monitor any number of wind turbines of any number of wind farms.

The SCADA system may further log data regarding any number of the wind turbine such as failures, health information, performance, and the like. The SCADA system may allow access to the log data to one or more digital devices.

While examples of wind farms and wind turbines are discussed herein, it will be appreciated that SCADA systems may be utilized on any type of electrical asset or combination of different types of electrical assets including, for example, solar power generators, legacy electrical equipment, and the like.

SCADA system provide important signals for historical and present status of any number of wind turbines (WTs).

In various embodiments, the data interface 502 may interface with one or more SCADA systems and the user/developer input 504 may receive parameters for model creation from one or more authorized users (e.g., from the power system 106, a service provider, electrical grid operator, operator of renewable energy assets, electrical customer, or the like).

The data interface 502 may receive event and alarm data from one or more SCADA systems used to supervise and monitor any number of wind turbines. The data interface 502 may receive detailed event and alarm logs as well as event and alarm metadata. The SCADA information may be the event and alarm logs as well as alarm metadata.

The event and alarm logs may include, but are not limited to, a turbine identifier (e.g., turbineID), event code (e.g., EventCode), event type (e.g., EventType), event start time (e.g., EventStartTime), event end time (e.g., EventEndTime), component, subcomponent, and/or the like. The turbine identifier may be an identifier that identifies a particular wind turbine or group of turbines. An event code may be a code that indicates an event associated with performance or health of the particular wind turbine or group of turbines. The event type may be a classification of performance or health. An event start time may be a particular time that an event (e.g., an occurrence that affects performance or health) began and an event end time may be a particular time that the event ended. Components and subcomponents may include identifiers that identify one or more components or subcomponents that may be affected by the event.

The alarm metadata may include, but is not limited to, an event code (e.g., EventCode), description, and the like.

FIG. 7a depicts an example event log. The event log includes a turbine identifier, an event code number, a turbine event type, an event start time (e.g., EventStartUTC) which identifies a time of a beginning of an event using universal time, an event end time (e.g., EventEndUTC) which identifies a time of an ending of an event using universal time), description, turbine event identifier, parameter 1, and parameter two.

In this example, the same wind turbine is undergoing four different events, including a change in wind speed, a change in pitch, a remote power setpoint change, and a generator outage.

FIG. 7b depicts example alarm metadata. The event metadata example of FIG. 7b includes an event description and an event code. In various embodiments, the event metadata is not necessary for model development. In some embodiments, all or some of the event metadata may assist for model interpretation.

The data interface 502 may receive historical wind turbine component failure data and wind turbine asset metadata from one or more SCADA systems used to supervise and monitor any number of wind turbines. In addition to logs and alarm metadata, the SCADA information may include component failure data and asset metadata.

The historical wind turbine component failure data may include but not be limited to a turbine identifier (e.g., TurbineId), failure start time (e.g., FailureStartTime), failure end time (e.g., FailureEndTime), component, subcomponent, part, comments, and/or the like. The turbine identifier may identify a wind turbine or group of wind turbines. A failure start time may be a time where a failure of a component, subcomponent, or part of the wind turbine begins. A failure end time may be a time where a failure of a component, subcomponent, or part of the wind turbine ends.

The wind turbine asset data may include, but is not limited to, wind turbine generation, mark version, geolocation, and/or the like. Wind turbine generation may indicate an amount of power being generated. A mark version may be a version of a component, subcomponent, part, or wind turbine. The geolocation may indicate the geographic location of a wind turbine or group of wind turbines.

The user/developer input 504 may receive may receive configuration information including parameters for cross-validation, training, and testing (including time periods such as a prediction time period and a lookahead time window).

Figure 8:
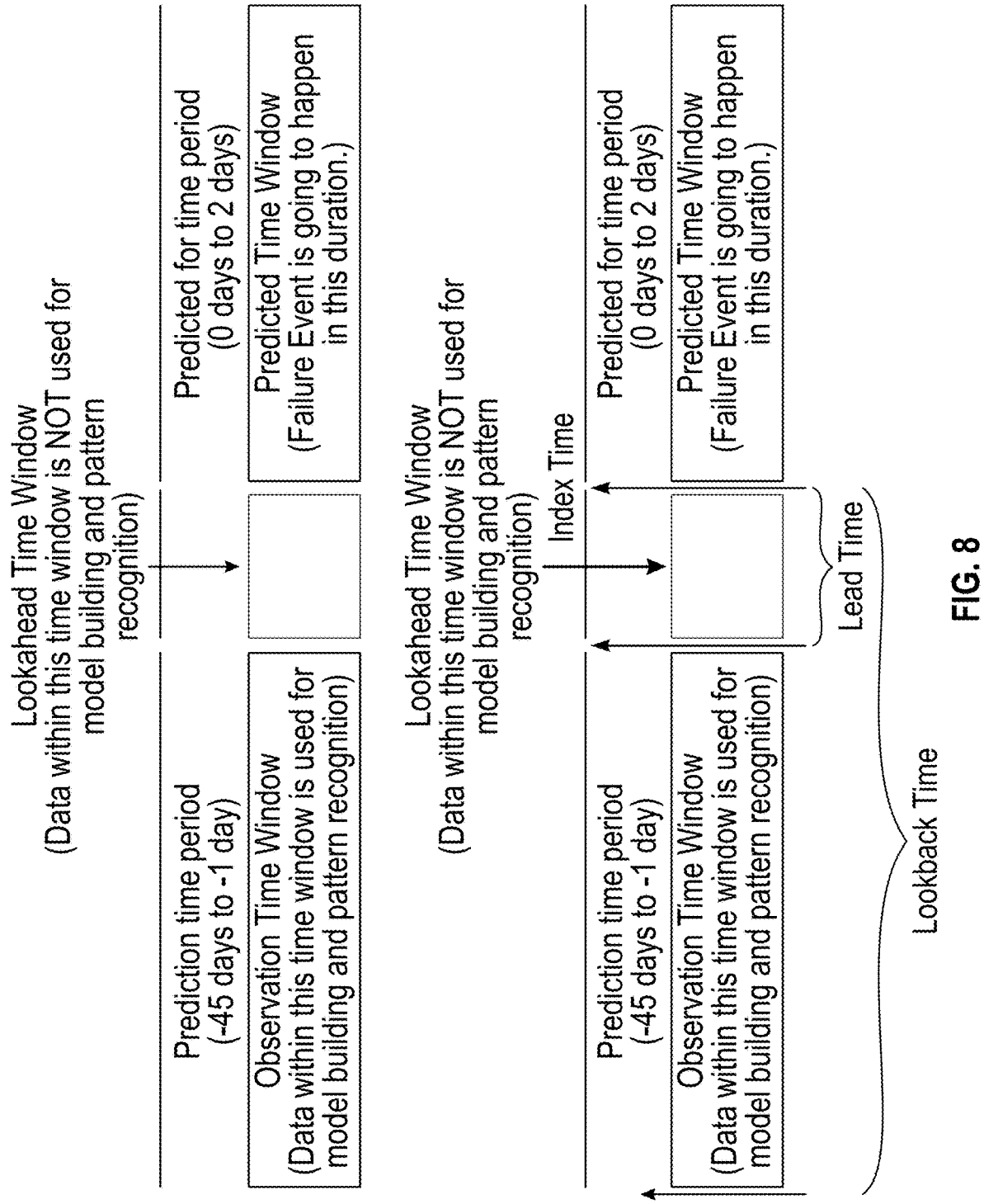
FIG. 8 characterizes problems and propose solutions in some embodiments.

FIG. 8 characterizes problems and propose solutions in some embodiments. The graph in FIG. 8 depicts sensor readings from multiple sensors over a period of time leading up to failure. The time before the failure is indicated as "lead time." One goal may be to improve lead time with sufficient accuracy such that alerts may be issued and/or actions taken to mitigate consequences of failure or avoid failure prior to that failure occurring.

FIG. 8 is an example longitudinal evaluation framework of failure prediction. The longitudinal evaluation framework includes three periods of time, including a prediction time period, a lookahead time window, and a predicted for time period. In some embodiments, sensor data received and/or generated during the prediction time period may be used for model building and pattern recognition. Failure event labels may be extracted from the duration of the predicted time window.

The prediction time period is an observation time window where historical sensor data that was generated by sensors during this time window and/or received during this time window is used for failure prediction model building and pattern recognition for different models (e.g., with different amounts of lookback time). The lookahead time window is a period of time when sensor data generated during this time window and/or received during this time window is not used for model building and pattern recognition. In various embodiments, sensor data generated and/or received during the ahead time window may be used to test any or all failure prediction models. The predicted time window is a time period where failure is expected to happen.

In the example of FIG. 8, the prediction time period is −45 days to −1 day (prior to the lookahead time window) and the predicted time window is 0 to 2 days after the lookahead time window. Different failure prediction models may be generated with different amounts of prediction time periods (e.g., different models use a different number of days of sensor data) and different amounts of lookahead times (e.g., different models use a different number of days before predicted failure).

It will be appreciated that the predicted time period may be any length of time prior to the lookahead time window and that the predicted time window can be any length of time after the lookahead time window. One of the goals in some embodiments described herein is to achieve an acceptable level of accuracy of a model with a sufficient lead time before the predicted time window to enable proactive actions to prevent failure, to scale the system to enable detection of a number of component failures, and to improve the accuracy of the system (e.g., to avoid false positives).

Further, as used herein, a model training period may include a time period used to select training instances. An instance is a set of time series/event features along with the failure/non-failure of a particular component in a renewable energy asset (e.g., a wind turbine) in a specified time period. A model testing period is a time period used to select testing instances.

In some embodiments, a balanced input may require a minimum of failure history (e.g., 20%) which can be copied by subsampling the non-failure history and by boosting the failure history data (e.g., sliding window for the failure history data).

In order to identify early leading signal pattern of wind turbine failure, masking/unmasking technique may be used to produce training, validation and testing date sets to attain time series snapshots. In some embodiments, the configuration generation module 512 or any module (e.g., from a template or the like) may perform the masking/unmasking technique.

Figure 9:
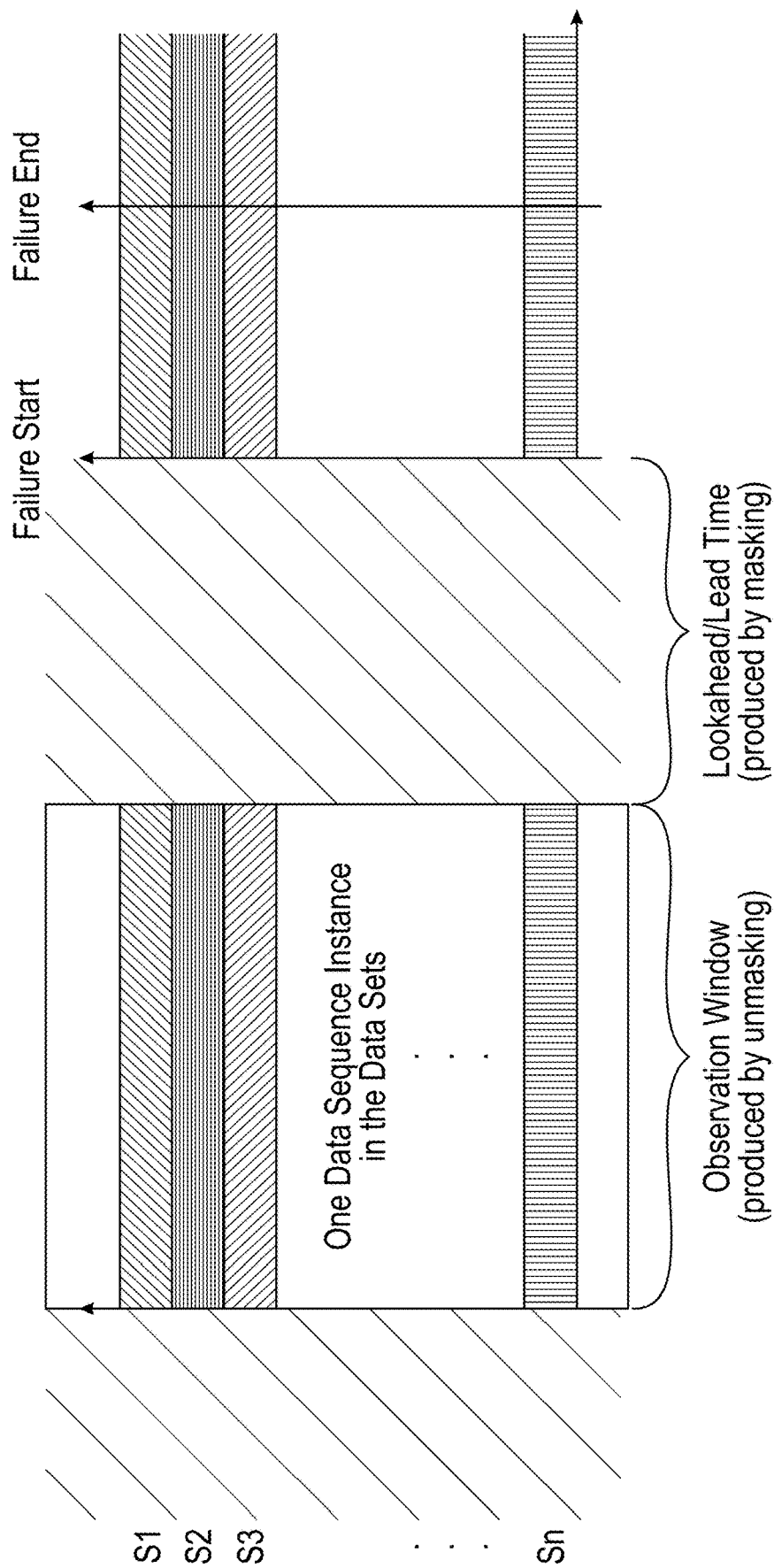
FIG. 9 is a depiction of masking and unmasking in some embodiments.

Masking duration serves as lookahead time window/leading time window. Unmasking duration serves as observation window. For wind turbine assets with failure events, this masking/unmasking technique provides time series data sequences representing failure patterns at the desired lead time for model development FIG. 9 is a depiction of masking and unmasking in some embodiments. Varying masking and unmasking duration produces different data sequence instances to represent wind turbine behaviors at different stages of the degradation life cycle and provides source information to model development process to identify leading failure risk factors at different stages and meet the business needs. For healthy wind turbine without any failure events, this masking/unmasking technique can produce numerous healthy data sequences and down-sampling can be applied to select adequate instances for model development.

In various embodiments, the an authorized user or digital device may control parameters by providing the information to the user/developer input 504. In one example, an authorized user may specify a specific lookahead window (e.g., lead time) to meet a particular maintenance requirement and/or with minimal changes. Based on business requirements, the authorized user may identify specific optimizing metrics for cross-validation, training, and/or evaluation of models. In one example of optimizing metrics, the authorized user may select or identify optimizing failure coverage rate (sensitivity) vs. positive failure rate (precision). Further, the parameters may include different training durations and historical length of data requirements for scoring.

Figure 10:
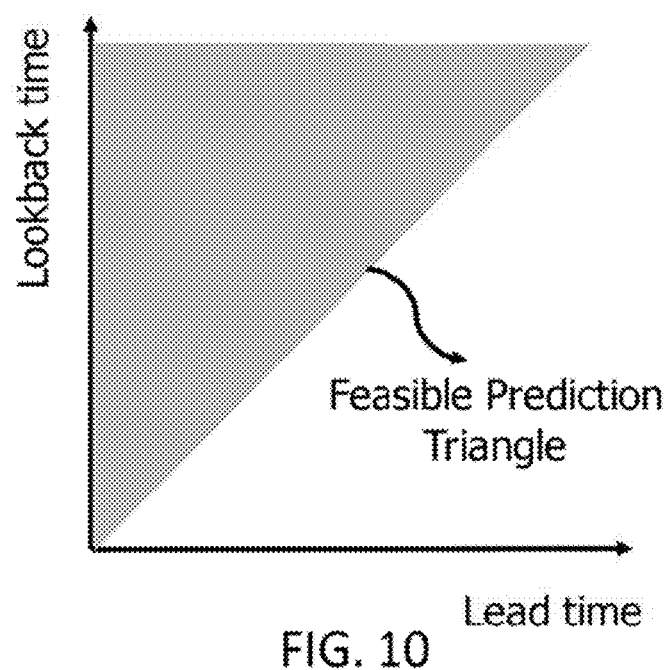
FIG. 10 depicts a graph defining an example feasible prediction triangle as defined by lookback time and lead time.

FIG. 10 depicts a graph defining an example feasible prediction triangle as defined by lookback time and lead time. The feasible prediction triangle may be based on determining a lookback time and a lead time. The feasible prediction triangle may further be utilized for optimization.

In various embodiments, the component failure prediction system 104 may identify different lookback times (e.g., different prediction time periods) by evaluating different amounts of historical sensor data and identify different lead times. For example, the component failure prediction system 104 may receive two months of historical sensor data. The component failure prediction system 104 may train a failure prediction model using 45 days of historical sensor data, another failure prediction model of the same set using 40 days of the same sensor historical sensor data, a third failure prediction model of the same set using 35 days of the same sensor historical sensor data, and so forth. Similarly, for any number of failure prediction models, the component failure prediction system 104 may utilize different amounts of lead time thereby defining the feasible prediction triangle differently for each failure prediction model evaluation in order to determine the most preferred model based on time and metric evaluation of performance.

By providing parameters such as component selections, time windows, and metric selections, an authorized user or digital device may control the component failure prediction system 104 to create models regarding component(s) that are selected, control time windows to meet business or infrastructure constrains, and control metrics to optimize for a preferred performance.

In various embodiments, the component failure prediction system 104 may generate a set of failure prediction models using at least some historical sensor data and/or SCADA information. For example, if the authorized user or digital device requests generation of failure prediction models for a particular component but does not input specifically required observation time windows or lead times, the component failure prediction system 104 may generate a plurality of failure prediction models for the particular component but using different observation time windows and/or lead times (e.g., using different portions of the historical sensor data and/or the SCADA information based on the different observation time windows using different masking/unmasking, for example). The component failure prediction system 104 may evaluate each of the set of failure prediction models and compare an evaluation of each of the failure prediction models to enable selection of any number of the set of models for further training and/or utilization. Selection may be based on standardized metrics, the component (or component type), and/or business need.

The data extraction module 506 may extract or filter the information received by the data interface 502 and/or the user/developer input 504. It will be appreciated that any amount of data may be received by the data interface 502 (e.g., from any number of SCADA systems) and the user/developer input 504. The data extraction module 506 may extract information relevant to the models to select, train, test, and score.

In various embodiments, the data extraction module 506 receives one or more component identifier(s) from the user/developer input 504. The component identifier may identify a component, type of component, group of components, type of group of components, part, or asset to generate any number of failure prediction models.

The data extraction module 506 may retrieve historical sensor data, failure records, event records, wind turbine metadata, time series data, and/or the like related to the identified component. For example, the data extraction module 506 may filter historical sensor data from any number of sensors of any number of components and retrieve the historical sensor data from sensors related to the identified component.

Further, the data extraction module 506 may receive parameters such as time windows from an authorized user or device as discussed herein. The data extraction module 506 may retrieve historical sensor data, failure records, event records, wind turbine metadata, time series data, and/or the like related to the identified component and generated during an observation time window (e.g., by filtering a larger set of data to retrieve the data related to the identified component (s) during the desired time window(s)). The data extraction module 506 may provide the extracted component information to the high-level data quality check module 508 and/or the quality check module 514. The data extraction module 506 may modify the event and alarm log data from the event and alarm log and/or the alarm metadata to represent the event and alarm data in a vendor agnostic and machine readable way (e.g., by structuring the event and alarm log data).

The data extraction module 506 may generate an event and alarm vendor agnostic representation of data from SCADA systems (e.g., from event and alarm logs). In various embodiments, the data extraction module 506 receives the event and alarm logs as well as event and alarm metadata.

For example, the data extraction module 506 may receive event and alarm log data from the data interface 502. In some embodiments, data extraction module 506 further receives alarm metadata. The data extraction module 506 may assign any or all of the event codes to a unique feature identifier (FID). The identifier may be used as a column index in a data extraction module 506 extracts information from the event and alarm log and the alarm metadata, assigns a unique feature identifier, and generates the feature matrix.

In various embodiments, the data extraction module 506 parses information from the event and alarm log data and/or alarm metadata to generate one or more feature matrixes. In some embodiments, the data extraction module 506 may utilize different templates associated with different SCADA outputs to parse the information and generate the feature matrix(es) to structure the data.

The data extraction module 506 may mine and discover patterns among the event and alarm data in the longitudinal history (e.g., patterns may be as simple as unique event code counts in a past time period such as a month, advanced time sequence patterns such as A→B→C, or complicated encoded event sequence vectors). In various embodiments, the data extraction module 506 may utilize the feature matrix(es) to discover patterns. The data extraction module 506 may provide the discovered patterns to the cross-validation module 520.

The data extraction module 506 or the feature extraction module 524 may perform longitudinal pattern extraction by counting a number of each event code that happened during a certain time interval (e.g., based on the observation time window).

In various embodiments, the data extraction module 506 provides the capability to consider dynamics of event codes in a longitudinal time dimension which may include important features for wind turbine failure forecasting and may be impractical to extract from operational signals.

In various embodiments, the data interface 502 may also receive operational signals of one or more SCADA systems. The data extraction module 506 may optionally extract operational features from the operational signals and provide them to the model training and testing module 534 and/or cross-validation module 520 to be utilized in addition to the patterns and/or the pattern matrix in addition to historical sensor data to train the set of models.

By leveraging SCADA logs and metadata using agnostic representations to derive patterns useful in machine learning, the failure prediction models may improve accuracy and scalability. It will be appreciated that the event logs, alarm information, and the like generated by SCADA may reduce processing time for model generation thereby enabling multiple failure prediction models to be generated in a timely matter (e.g., before the historical sensor data becomes scale) enabling scaling of the system yet with improved accuracy. It may also be appreciated that generating a different failure prediction model for different components or groups of components of a set of wind turbines (or any renewable energy assets) is computationally resource heavy and thereby may slow the process of model generation. This problem is compounded when creating a set of failure prediction models for each of the different components or groups of components of a set of wind turbines and evaluating different observation windows and lead times to identify preferred failure prediction models with better accuracy at desired lead times.

Some systems and methods described herein may overcome the current challenge of using SCADA logs and metadata from different sources and utilizing the information to improve scalability and improve accuracy of an otherwise resource-intensive process, thereby overcoming a technological hurdle that was created by computer technology.

In some embodiments, the data extraction module 506 extracts information from the event and alarm log for a first time period, the alarm metadata for the same first time period, failure data for the same first time period, and cohorts determined by the cohort generation module 516 in generating the feature matrix.

In various embodiments, the feature selection module 528 may receive extracted features, event data, and labels (e.g., failure or no failure) for each instance.

The high-level data quality check module 508 may review the extracted component data retrieved by the data extraction module 506 to ensure that there is sufficient information for model selection and/or training. For example, the high-level data quality check module 508 may review the extracted component data to ensure that there is at least a predetermined amount of data (e.g., 80%) available for each time series signal for the model creation's time frame (e.g., the observation time window).

The quality check module 514 may review features related to feature identifiers (discussed herein) to ensure that there is sufficient information within the identified features. The quality check module 514 may send an alarm or error if there is missing information (e.g., a feature is identified but without any data) and/or insufficient information below a predetermined amount of data.

The configuration template generation module 510 may generate configuration templates for each component/geographic location component pairing. In various embodiments, the configuration template generation module 510 may identify pairs of components and/or component groups with geographic locations (e.g., from the SCADA metadata) and generate configuration templates for any number of the pairs. The configuration template may include, for example, the parameters for model creation (e.g., observation time window, lead time, and the like), features (e.g., all features or a subset of features from the historical sensor data and/or the SCADA system information that are to be used for training), aggregation and transformation methods, as well as training, testing, and scoring scopes that may be overwritten at the model configuration generation.

The configuration generation module 512 may update any number of configuration template(s). In some embodiments, each time one or more models are generated, tested, and/or scored, the configuration generation module 512 may modify and/or update the configuration template to include information regarding parameters of the generation, testing, and/or scoring. This enables parameter information and the like to be preserved between different pipelines and for different model validation, training, testing, and scoring.

The generate feature dimension module 532 may be configured to map features including, for example, features from the event descriptions, event codes, time series signal names, and feature identifiers which are used for model generation, testing, and/or scoring. For example, the generate feature dimension module 532 may map or track feature identifiers from the extracted/filtered historical sensor data and/or SCADA information for model creation, testing, and/or scoring.

The cohort generation module 516 may generate a scope file that includes, but is not limited to, a farm identifier, turbine identifier, start data of observation (e.g., sensor data from sensors of the identified turbine), end date of observation, and instance identifier (e.g., to mark each row in the scope). In some embodiments, the cohort generation module 516 may include in the scope file a target (e.g., at model selection and training-testing to mark the feature as 0 or 1 as a new model creation, training, testing, and/or scoring is executed).

In some embodiments, the cohort generation module 516 may receive the failure data and asset data. The cohort generation module 516 may generate or extract cohorts for model development. For example, a cohort may be a set of wind turbines having the same controller type and operating in a similar geography. In one example, example, cohort generation module 516 identifies similar or same controller types based on the asset data and the geolocation to generate any number of cohorts.

The cohort generation module 516 may also identify both healthy time window instances and component failure time window instances from the failure data for any number of components, subcomponents, parts, assets, and/or cohorts.

The data processing module 522 may perform interpolation, standardization, and/or normalization of any amount of the historical sensor data and/or any amount of the SCADA information. The data processing module 522 may conduct basic event data quality checks such as, but not limited to: daily availability check (e.g., minimum number of daily event code counts), event code option check (e.g., non-recognizable event), timestamp availability check, and/or the like. The data processing module 522 may also conduct cleaning based on defined business rules (e.g. discard event data without start timestamp, and/or the like).

The feature extraction module 524 may extract features (e.g., dimensions and/or variables) from the received historical sensor data and/or SCADA information. The multivariate sensor data may, as discussed herein, be time series data. For example, the quality check module 514 may extract features from the time series data. The quality check module 514 may provide the extracted features to the data processing module 522 and/or the feature extraction module 524.

In various embodiments, feature extraction may also refer to the process of creating new features from an initial set of data. These features may encapsulate central properties of a data set and represent the data set and a low dimensional space that facilitates learning. As can be appreciated, multivariate sensor data (e.g., historical sensor data or current sensor data) may include a number of features that are too large and unwieldy to be effectively managed and may require an unreasonable amount of computing resources. Feature extraction may be used to provide a more manageable representative subset of input variables. It will be appreciated that feature extraction may extract features for the data as well as create new features from the initial set of data. It will be appreciated that, in some embodiments, dimensions may refer to columns (e.g., features or variables) of the received historical sensor data.

In various embodiments, the feature extraction module 524 may extract and/or create new features including, but not limited to, gradients, ratios, skew, and/or temporal statistics (e.g., daily averaging and/or standard deviation).

The feature construction module 526 may create new features for model and scoring. For example, the feature construction may extract one or more metrics to create new features to be included for failure prediction training, including, for example, signal mean, standard deviation during observation time window(s), daily signal trend, skew, and/or the like.

The feature selection module 528 may select features that have important predictive values of failure accidence (e.g., based on information gain).

The cross-validation module 520 may cross validate any of the failure prediction models. In cross-validation module 520 may partition a sample of data (e.g., including at least some of the cleaned, extracted features of the historical sensor data and the SCADA patterns) into complimentary subsets and performs analysis on one subset performing the analysis on one subset (training set), and validating the analysis on the other subset (validation set or testing set). The cross-validation module 520 may perform multiple rounds using different partitions and the validation results may be combined (e.g., averaged) of the rounds to give an estimate of the model's prediction performance. In some embodiments, the cross-validation module 520 may cross-validate each of any number of failure prediction models for a component or set of components and then make selections of one or a subset of failure prediction models for further training and testing (e.g., based on the validation results).

In one example, the cross-validation module 520 may divide training data (e.g., historical sensor data and/or SCADA information such as pattern and/or features) into a predetermined number of subsets (e.g., five folds) for training different failure prediction models using different amounts of data. For example, the feature selection module 528 may divide the data to be used for training (e.g., generated during the observation time window) into five subsets. The cross-validation module 520 may train new models using different permutations of four subsets, leaving a different subset for evaluation/testing to find preferred or optimal parameter and establish cross-validation performance. For example, the component failure prediction system 104 may train a first model, using subsets 1-4 and evaluate the first model with subset 5. Subsequently, the component failure prediction system 104 may train a second model, using subsets 2-5 and evaluate the second model with subset 1. This process can continue until five models are created with different subsets of data and evaluated by a different subset of the data.

The cross-validation module 520 may aggregate performance measures of any number of the fault prediction models created using the divided training data set and/or make selections of preferred fault prediction models to estimate the model's predictive performance.

In some embodiments, the cross-validation module 520 may only divide training data into subsets if there is limited data for training. In one example, the component failure prediction system 104 may assess the amount of data for training (e.g., by the high-level data quality check module 508 or the quality check module 514). If the amount of available data for training falls below a feature selection threshold, the cross-validation module 520 may divide the training data into subsets. If the amount of available data for training is above the feature selection threshold, the feature selection module 528 may not make the divide the data and all of the data may be utilized for failure prediction training.

In various embodiments, the cross-validation module 520 may provide and/or select models for further training, including parameter settings, thresholds (e.g., trigger thresholds), and/or the like. In some embodiments, the cross-validation module 520 may utilize the performance output of the assessment above to select one or more (e.g., a subset) of failure prediction models to train. The cross-validation module 520 may also provide performance and/or other statistics related to the selected failure prediction models (e.g., averages and standard deviation). In some embodiments, the cross-validation module 520 provides the parameters (e.g., component names, observation time windows, lead times, and/or the like) of selected models (e.g., those with acceptable predictive performance) for storage in a template by the exp. configuration template generation module 510 and/or the exp. configuration generation module 512.

In some embodiments, the performance measures module 530 may perform analysis of any number of failure prediction models (e.g., each model from the cross-validation module 520). In various embodiments, failure prediction models are assessed based in comparison of the statistics provided by the cross-validation module 520 and/or the analysis of the performance measures module 530. The performance measures module 530 is further described herein.

In some embodiments, the performance measures module 530 assesses each model from the cross-validation module 520 by using standardized metrics. By comparing the performance of the different models, the performance measures module 530 may select failure prediction models for further testing with a greater scope of historical sensor data and/or SCADA information.

In various embodiments, the performance measures module 530 compares the predictions of each failure prediction model of a set of failure prediction models using historical sensor data to compare the results against ground truth (e.g., known failures and known periods of time that the component did not fail). The performance measures module 530 may separate the outcomes into qualitative categories including true positives (TP), false positives (FP), true negatives (TN), false negatives (FN), positives (TP+FN), and negatives (TN+FP).

The performance measures module 530 may utilize a failure forecasting performance measures (e.g., standard metrics in any detection/classification model). The metrics may include any or all of the following:

Confusion Matrix (FP,FN,TP,TN)
Receiver Operating Characteristics
Area Under the Curve
Predicted Failure→Failed: True Positive
Predicted Failure→Not Failed: False Positive
Predicted Non-failure→Not Failed: True Negative
Predicted Non-failure→Failed: False negative
Examples of the metrics may include the following:
Sensitivity, Recall, Hit Rate, or True Positive Rate (TPR):

TPR=TP/$P$=TP/(TP+FN)

Specificity or True Negative Rate (TNR)

TNR=TN/$N$=TN/(TN+FP)

Precision or Positive Predictive Value (PPV)

PPV=TP/(TP+FP)

Negative Predictive Value (NPV)

NPV=TN/(TN+FN)

Miss Rate or False Negative Rate (FNR)

FNR=FN/$P$=FN/(FN+TP)=1-TPR

Fall-out or False Negative Rate (FNR)

FPR=FP/$N$=FP/(FP+TN)=1-TNR

False Discovery Rate (FDR)

FDR=FP/(FP+TP)=1-PPV

False Omission Rate (FOR)

FOR=FN/(FN+TN)=1-NPV

Accuracy (ACC)

ACC=(TP+TN)/($P$+$N$)=(TP+TN)/(TP+TN+FP+FN)

The F1 score is the harmonic mean of precision and sensitivity:

$$F_1 = 2 \cdot \frac{PPV \cdot TPR}{PPV + TPR} = \frac{2TP}{2TP + FP + FN}$$

The Matthews correlation coefficient (MCC) is:

$$MCC = \frac{TP \times TN - FP \times FN}{\sqrt{(TP+FP)(TP+FN)(TN+FP)(TN+FN)}}$$

The informedness or Bookmaker Informedness (BM) is:

BM=TPR+TNR−1

The Markedness (MK) is

MK=PPV+NPV−1

In one example, the precision or positive predictive value of a failure prediction model may indicate that out of four alerts, three alerts are true failure cases and one alert is a false failure case which leads to 75% precision. In other words, if someone sends a crew based on this alarm, three times will result in preventative maintenance of any turbine downtime.

Figure 11:
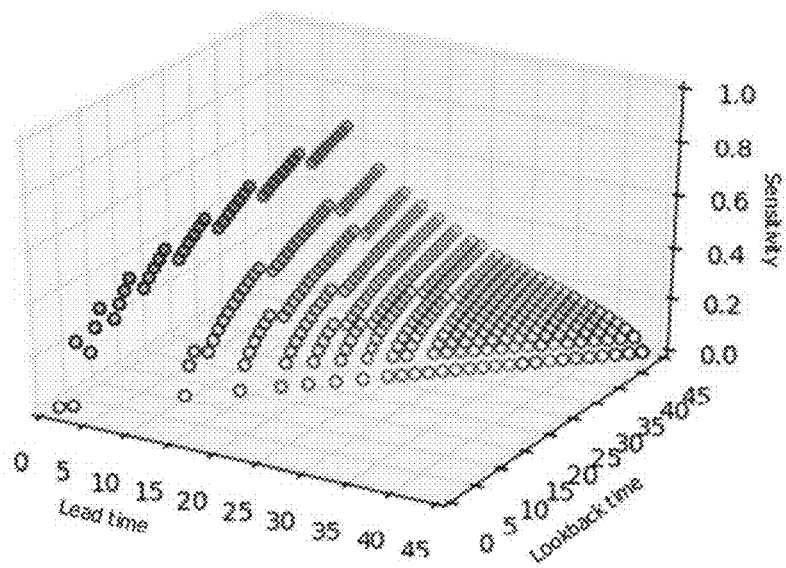
FIG. 11 depicts a curvature analysis that can be done for any or all of the performance metrics.

In various embodiments, the performance measures module 530 determines a receiver operator characteristic area under the curve (ROC AUC) to assist in model performance evaluation. The Operating Characteristic Area Under the Curve is a measure of classifier performance in machine learning. When using normalized units, the area under the curve is equal to the probability that a classifier will rank a randomly chosen positive instance higher than a randomly The performance measures module 530 may test the different failure prediction models of different lead times and lookback times and compare the different evaluations to identify a preferred model. FIG. 11 depicts a curvature analysis that can be done for any or all of the performance metrics. In the curvature analysis, each ball in the three dimensional graph is a separate evaluation of the same model using different lead and lookback times and identifying the value of sensitivity for each evaluation.

In one example, the performance measures module 530 evaluated different failure prediction models of different lookback and lead times:

| Lookback Time | Lead Time | Train AUC | Train Sensitivity | Train Precision | Train Specificity |
|---|---|---|---|---|---|
| 31 | 1 | 71% | 54% | 63% | 69% |
| 33 | 3 | 92% | 83% | 83% | 83% |

With the increase of lead time from 1 to 3 days and consistent 30 days observation time window (lookback time−lead time), all the performance measure metrics are improved. As such, the performance measures module 530 may select a failure prediction model with the lookback time of 33 days and lead time of 3 days as the configuration to apply for new data to predict future faults.

The performance measures module 530 may assist in identifying those models from the cross-validation module 520 to further train, test, and evaluate based on comparison of the metrics for each model to each other.

In various embodiments, a performance curvature may be assessed to assist in selection of a preferred failure prediction model. The performance look-up gives an expected forecasting outcome for a given lookback and lead time requirement. The performance look-up gives a reasonable lookback and lead time that an operator can expect (e.g. if an operator wants the sensitivity of the model being greater than 50%, the curvature will give the necessary lookback and appropriate lead time). As a result, the performance look-up gives a clear and comprehensive failure prediction model to model performance evaluation for all the possible choices (e.g., thereby enabling a selection of a failure prediction model for each set of failure prediction models).

In various embodiments, the performance measures module 530 may generate the performance curvature, including the lookback and lead times to enable a user or authorized device to select a point along the performance curvature to identify and select a model with an expected forecasting outcome.

The performance measures module 530 be configured to provide the performance curvature, any number of failure prediction models of a set of failure prediction models for a component or set of components, evaluations of the failure prediction models of a set, comparison of the evaluations, and the like to an entity authorized to make a selection of a failure prediction model. There may be any number of selected models, each of the selected models being for a different component, component type, groups of component, groups of component type, asset, and/or asset type.

In various embodiments, the component failure prediction system 104 may select one or more of the failure prediction models for further training and testing. For example, the component failure prediction system 104 may select any number of the failure prediction models based on the results of cross-validation and/or the evaluation of the models by the performance measures module 530.

In various embodiments, the component failure prediction system 104 may store any or all of the parameters, SCADA information, historical sensor data, model(s), results of cross-validation, results of performance, features, cohorts, SCADA patterns, and/or the like for future use. In some embodiments, the component failure prediction system 104 may create any number of failure prediction models using different historical sensor data and SCADA information in sequence or in parallel. The component failure prediction system 104 may train, test, score, and/or utilize failure prediction models for any number of components. In some embodiments, the component failure prediction system 104 may store any of the information for later retrieval depending on computational resource availability.

Figure 12:
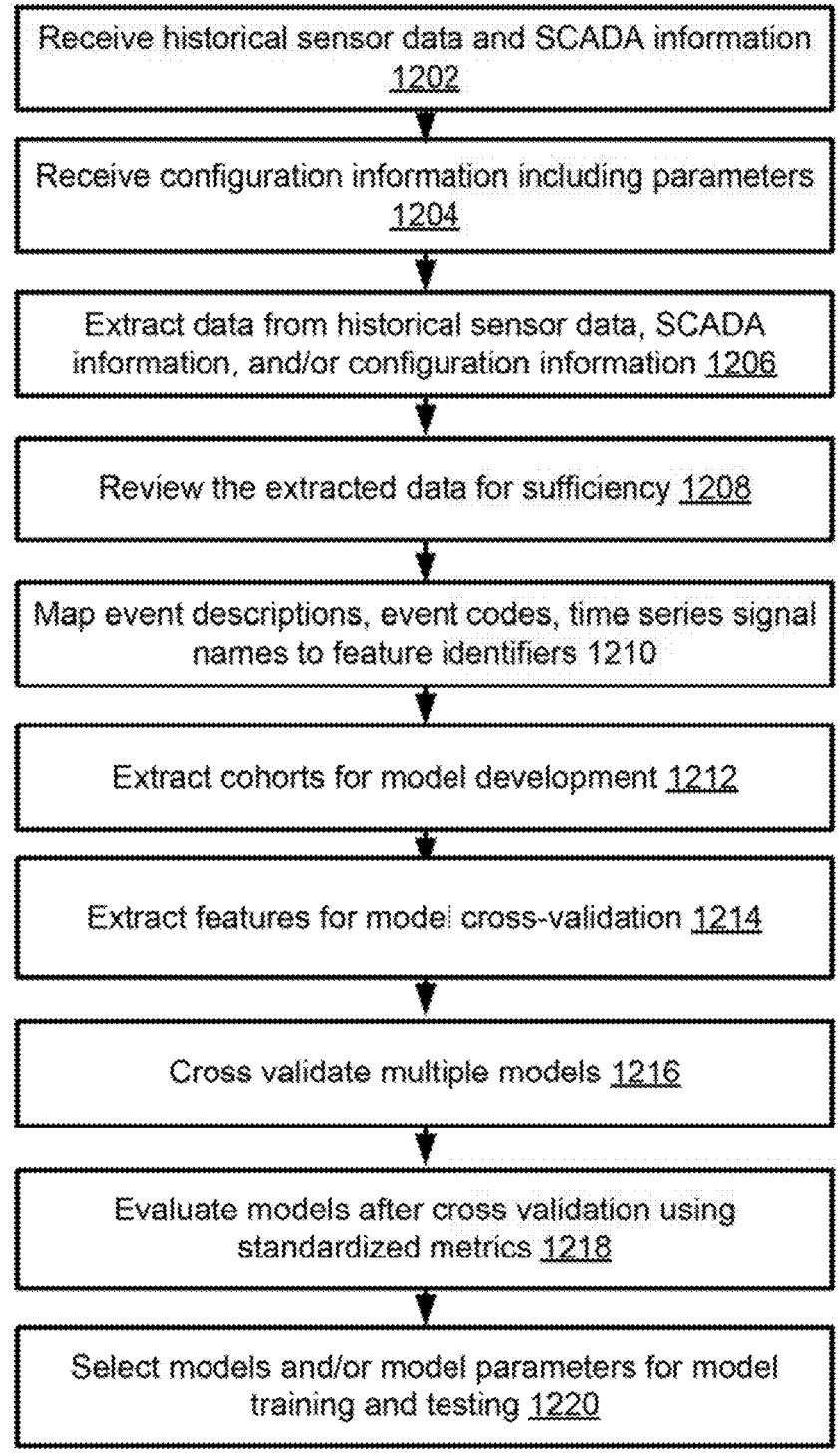
FIG. 12 is a flowchart for the model selection pipeline in some embodiments.

FIG. 12 is a flowchart for the model selection pipeline in some embodiments. In step 1202, the data interface 502 receives historical sensor data and SCADA information. For example, the data interface 502 may receive failure records, SCADA time series data, event records, and wind turbine meta data. In some embodiments, one or more SCADA systems provide event and alarm data that may include failure records that indicate failure(s) of one or more components or component groups of any number of wind turbines, event record(s) that indicate events of one or more components or component groups of any number of wind turbines, SCADA time series data of a predetermined duration (e.g., 10 minutes) indicating operation of the SCADA system, performance of any number of turbines, historical sensor data, and/or the like, as well as wind turbine meta data.

It will be appreciated that the SCADA information may include data regarding any number of components and groups of components of wind farm assets. The component failure prediction system 104 may receive a component or group of components from a user along with other parameters to create or assist in creating failure prediction models for the identified components or groups of components. As such, the component failure prediction system 104 may retrieve (e.g., filter) information related to the components or groups of components identified by the user (e.g., from the user/developer input 504).

In step 1204, the user/developer input 504 may receive configuration information including parameters for training and testing (including observation time windows for lookback times and/or lead times) as well as component selections. The configuration information and component selections may be utilized to control failure prediction model creation.

FIG. 13 depicts example configuration information that may be received by the user/developer input 504 for a generator failure. Some parameters are highlighted in FIG. 13. FIG. 14 depicts example configuration information for a gearbox failure whereby parameters are highlighted.

FIG. 15 depicts an example of customization enabled by providing configuration information for model selection, training, testing, and scoring. Item 1 of FIG. 15 depicts parameters of an observation window and a lookahead window. Item 2 depicts a selection of an optimizing measure (e.g., area under the curve or AUC). Item 3 indicates controls for training.

Although there are several controls and limitations identified in the parameters of FIG. 15, it will be appreciated that there may be any number of parameters as well as inputs that are missing some parameters (e.g., without a preferred optimizing measure or without observation window controls). In those circumstances, the model scoring (e.g., evaluation) may be performed using different observation time windows, different lead times, and different metrics to select a preferred failure prediction model by comparison with other models of different parameters.

In step 1206, the data extraction module 506 may extract data from the information received from the data interface 502 and/or the user/developer input 504. For example, the data extraction module 506 may receive a component identifier from the user/developer input 504. The data extraction module 506 may retrieve historical sensor data, failure records, event records, wind turbine metadata (e.g., wind turbine identifier (ID)), time series data, and/or the like related to the identified component. Further, the data extraction module 506 may receive parameters and time windows from an authorized user or device. The data extraction module 506 may retrieve historical sensor data, failure records, event records, wind turbine metadata, time series data, and/or the like related to the identified component and generated during an observation time window and the like. The data extraction module 506 may provide the extracted component information to the high-level data quality check module 508 and/or the quality check module 514.

In step 1208, the high-level data quality check module 508 and/or the quality check module 514 may review features of the historical sensor data and/or SCADA information for sufficiency.

In step 1210, the generate feature dimension module 532 maps event descriptions, event codes, time series signal names to feature identifiers (e.g., feature IDs).

In step 1212, the cohort generation module 516 extracts cohorts for model development. As discussed herein, a cohort may be a set of wind turbines having the same controller type and operating in a similar geography The cohort generation module 516 may create cohorts based on failure data and asset data.

In step 1214, the feature extraction module 524 and/or the feature construction module 526 may extract features from historical sensor data and/or SCADA information.

In step 1216, the cross-validation module 520 may cross validate multiple models. In one example, the cross-validation module 520 divides training data into subsets and trains models using n−1 of the subsets and testing/evaluating model each model on the portion of data not used for testing. Performance of each model may be assessed to assist in identifying hyper-parameters for further model creation.

In step 1218, the performance measures module 530 may evaluate any of the models from the cross-validation module 520 using standardized metrics (or metric(s) as selected by an authorized user or digital device as discussed herein).

In step 1220, based on the standardized metrics and/or cross-validation results, the performance measures module 530 may identify models to further test and/or parameters to use for model creation.

The model selection pipeline may evaluate performance of different failure prediction models as well as a combination of parameters (e.g., hyper-parameters) through cross-validation on the model training process. In various embodiments, this may ensure that a chosen failure prediction model with a set of parameters may perform close to the training performance.

Figure 16:
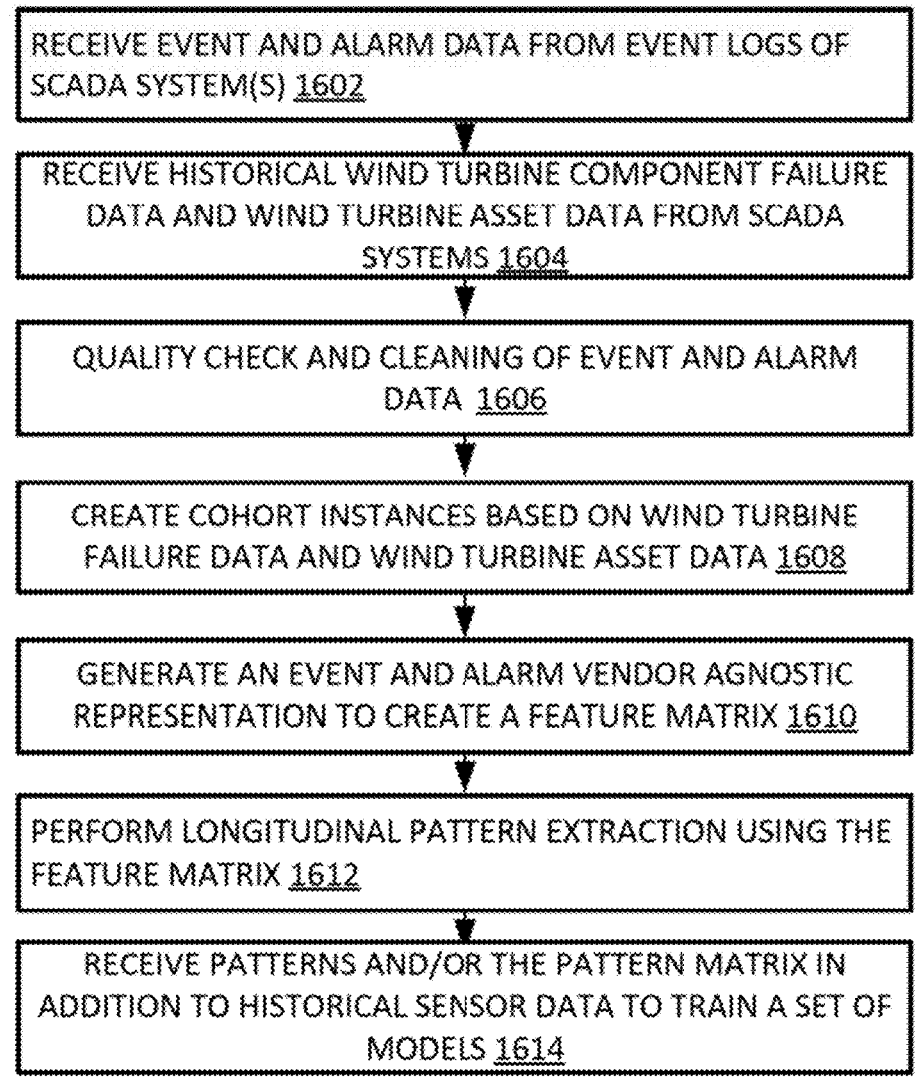
FIG. 16 is a flowchart for processing SCADA systems alarm and event logs for cross-validation and training in some embodiments.

FIG. 16 is a flowchart for processing SCADA systems alarm and event logs for cross-validation and training in some embodiments. Unfortunately, a large number of alarms and event logs generated by a SCADA system is often ignored in wind turbine forecasting of the prior art. Some embodiments of systems and method discussed herein leverages machine learning method(s) to extract a number of actionable insights from this valuable information. Different manufactures have completely different SCADA systems alarms and event logs. Even the same manufacture can have different generation of wind turbines with significant amount variation of event codes and logs. This is a barrier for effective and scalable ways to utilize event codes and logs for wind turbine (WT) failure forecasting.

In step 1602, the data interface 502 may receive event and alarm data from one or more SCADA systems used to supervise and monitor any number of wind turbines.

In step 1604, the data interface 502 may receive historical wind turbine component failure data and wind turbine asset metadata from one or more SCADA systems used to supervise and monitor any number of wind turbines.

In step 1606, the high-level data quality check module 508 may conduct basic event data quality checks such as, but not limited to: daily availability check (e.g., minimum number of daily event code counts), event code option check (e.g., non-recognizable event), timestamp availability check, and/or the like. The high-level data quality check module 508 may also conduct cleaning based on defined business rules (e.g. discard event data without start timestamp, and/or the like).

In step 1608, cohort generation module 516 may receive the wind turbine failure data and asset data. The cohort generation module 516 may generate or extract cohorts for model development. A cohort may be a set of wind turbines having the same controller type and operating in a similar geography. In one example, example, the cohort generation module 516 may identifies similar or same controller types based on the asset data and the geolocation to generate any number of cohorts.

The cohort generation module 516 may also identify both healthy time window instances and component failure time window instances from the failure data for any number of components, subcomponents, parts, wind turbines, and/or cohorts (e.g. instance number 2: 303615 had generator failure during 20180101-20180115).

In step 1610, the data extraction module 506 may generate an event and alarm vendor agnostic representation of data from SCADA systems (e.g., from event and alarm logs). In various embodiments, the data extraction module 506 receives the event and alarm logs as well as event and alarm metadata. In one example, the high-level data quality check module 508 or the data extraction module 506 may check whether the event and alarm logs as well as event and alarm metadata conform to standardized input interfaces.

The data extraction module 506 may modify the event and alarm log data from the event and alarm log and/or the alarm metadata to represent the event and alarm data in a vendor agnostic and machine readable way (e.g., by structuring the event and alarm log data).

FIG. 17 depicts an example feature matrix generated by the data extraction module 506 in some embodiments. The example feature matrix includes an event description, event code, and unique feature identifier. In some embodiments, a benefit of the method of generating a feature matrix is that information from the event and alarm log is structured and organized in a manner that is wind turbine manufacturer and generator independent.

In step 1612, the data extraction module 506 may mine and discover patterns among the event and alarm data in the longitudinal history (e.g., patterns may be as simple as unique event code counts in a past time period such as a month, advanced time sequence patterns such as A→B→C, or complicated encoded event sequence vectors). In various embodiments, the data extraction module 506 may utilize the feature matrix(es) to discover patterns. The data extraction module 506 may provide the discovered patterns to the cross-validation module 520.

The data extraction module 506 or the feature extraction module 524 may perform longitudinal pattern extraction by counting a number of each event code that happened during a certain time interval (e.g., based on the observation time window).

FIG. 18 depicts an example longitudinal pattern extraction matrix that identifies for each instance identifier a number that each unique feature identifier occurs in a period of time. For example, unique feature identifier 0 occurs 3000 for instance identifier 28, and unique feature identifier 190 occurs 29,450 for instance identifier 28 during the same period of time.

Figure 19:
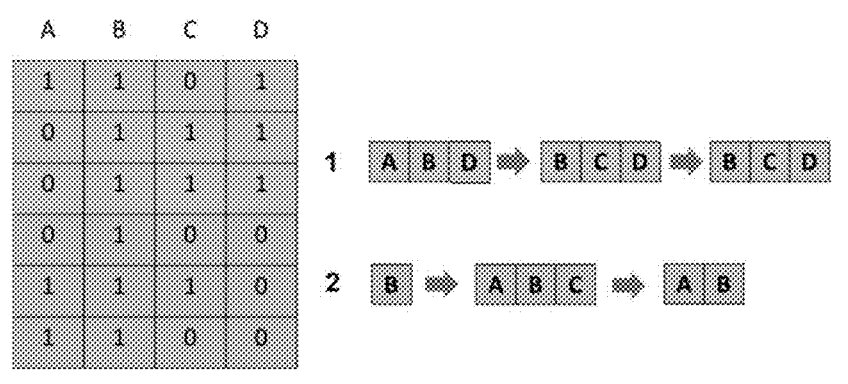

The data extraction module 506 may then count a number of each event code that occurred during the period of time and sequence events. FIG. 19 depicts example patterns that represent longitudinal patterns by distinct event sequences.

As discussed herein, in various embodiments, the data extraction module 506 provides the capability to consider dynamics of event codes in a longitudinal time dimension which may include important features for wind turbine failure forecasting and may be impractical to extract from operational signals.

The data extraction module 506 may extract information from the event and alarm log for a first time period, the alarm metadata for the same first time period, weather turbine failure data for the same first time period, and cohorts determined by the cohort generation module 516 in generating the feature matrix.

In various embodiments, the feature selection module 528 may receive extracted features, event data, and labels (e.g., failure or no failure) for each instance.

In step 1614, the cross-validation module 520, performance measures module 530, and/or the model training and testing module 534 may receive the patterns and/or the pattern matrix in addition to historical sensor data to cross validate failure prediction models and/or train a set of failure prediction models. As discussed herein, each set of failure prediction models may be for a component, set of components, or the like. The patterns and/or pattern matrix may be utilized in the process of cross-validation (e.g., divided into partitions as discussed herein), and/or utilized in training by the model training and testing module 534.

FIG. 20 is an example of the component failure prediction system 104 utilizing a model training and testing pipeline 2000 in some embodiments. The model training and testing pipeline may perform an evaluation process to obtain model performance on a data set this is outsampled in time (e.g., data that does not share any timeline with a training dataset).

In various embodiments, the model training and testing pipeline may train and/or test any number of fault prediction models produced by the selected model pipeline. The selected model pipeline may reduce a total number of failure prediction models to train and/or test by selecting a subset of models using different parameters thereby increasing scalability, efficiency and timeliness.

In some embodiments, the model training and testing pipeline may receive the same historical sensor data and/or SCADA information (e.g., generated during an observation time window that was used during cross-validation) from the data interface 502, the user/developer input 504, or a data store (that may have stored the historical sensor data and/or SCADA information that was previously received). Alternately, the model training and testing pipeline may receive different historical sensor data and/or SCADA information from the data interface 502, the user/developer input 504, or a data store (that may have stored the historical sensor data and/or SCADA information that was previously received).

In various embodiments, the model training and testing module 534 may receive the selected model(s), parameter settings for the selected model(s) (e.g., from a template or the feature selection module 528) and threshold(s) to train the models.

It will be appreciated that the model training and testing module 534 may train any number of selected failure prediction models of a set of failure prediction models for a component or group of components. Each the set of failure prediction models may be trained using at least some of the same historical sensor data and/or SCADA information but with different parameters (e.g., different observation time windows and lead time windows).

As discussed herein, the model training and testing module 534 may generate any number of failure prediction models using the historical sensor data, the SCADA patterns, and different configurations for lead and observation time windows. For example, the model training and testing module 534 may generate different failure prediction models for a component or set of components using different amounts of historical sensor data (e.g., historical sensor data generated over different time periods), using different patterns (based on event and alarm logs and/or metadata generated during different time periods), and with different lead lookahead times.

The model training and testing module 534 may utilize classification algorithms for model training. The classifications may include for example SVM, DeepLearning (such as CNN or CHAID). The training model input may include balanced input such as, for example, historical sensor data, extracted features from the historical sensor data, scoped anomaly time series from the historical sensor data, scoped weighted sensor timeseries from the historical sensor data, and/or failure indications. In some embodiments the timeseries data is a matrix where the start time the end time of the timeseries include maximum lead time, minimum lead time, and per desired time horizon (e.g., 45 days to 10 days before an event).

The model training and testing module 534 may generate any number of failure prediction models using the historical sensor data and different configurations for lead time. For example, the model training and testing module 534 may generate different failure prediction models of a set of failure prediction modules using different amounts of historical sensor data (e.g., historical sensor data generated over different time periods) and with different lead lookahead times. The model training and testing module 534 may evaluate any or all of the failure prediction models of each set generated by the model training and testing module 534 to identify a preferred failure prediction model of a set in comparison to the other preferred failure prediction models of a set based on preferred criteria (e.g., longer lead times are preferred).

The performance measures module 530 may evaluate any number of the failure prediction models and compare the evaluations to each other to provide a selected failure prediction module to be used for failure prediction using new data (e.g., to perform failure prediction of components and/or component groups of electrical assets in order to avoid damage and take timely corrective action). The performance measures module 530 may utilize the standard metrics discussed herein.

The model training and testing pipeline may utilize the data interface 502, the data extraction module 506, the high-level data quality check module 508, the config template generation module 510, the config generation module 512, the quality check module 514, the cohort generation module 516, the data processing module 522, the feature extraction module 524, the feature construction module 526, the feature selection module 528, the generate feature dimension module 532, the model training and testing module 534, and the performance measures module 530. In some embodiments, the model training and testing pipeline relies on historical sensor data, SCADA information, cohorts, extracted features, patterns, and the like generated by the model selection pipeline discussed herein.

It will be appreciated that the model training and testing pipeline may be tuned to optimize various design parameters provided by an authorized user or digital device (e.g., different lead time requirements for business needs).

In various embodiments, the model training and testing pipeline may test model performance of any number of failure prediction modules using data from the historical sensor data and/or based on the SCADA information that was not previously used for training. In some embodiments, historical sensor data and/or SCADA information received by the data interface 502 may divide the data such that different data may be used for cross-validation and training. In some embodiments, testing and/or validation may utilize data form the historical sensor data and/or based on the SCADA information that was not previously used for cross-validation or training.

In various embodiments, the model training and testing module 534 performs training on any number of failure prediction models (e.g., of a set of failure prediction models)

using data based on the historical sensor data and/or based on the SCADA information (e.g., features, patterns, cohorts, and the like). The model training and testing module 534 may further utilize selected algorithms, parameters, and thresholds of failure prediction models that were cross-validated to train the failure prediction models. In some embodiments, after training, each of the failure prediction models are tested using data not previously used for training (e.g., but from the same set of historical sensor data and/or based on SCADA information) to test against a ground truth. Each failure prediction model that passes testing (e.g., by comparison to one or more testing threshold to test for accuracy) may be further evaluated by the performance measures module 530.

The model training and testing module 534 may train any number of modules. For example, the model training and testing module 534 may train a set of failure prediction modules for a component, type of component, group of components, parts, or assets. Each of the set of failure prediction modules may be tested using data that was not utilized in training.

The performance measures module 530 may evaluate any or all of the failure prediction models of a set generated by the model training and testing module 534 to identify a preferred failure prediction model in comparison to the other preferred failure prediction models of the set and preferred criteria (e.g., longer lead times are preferred). The performance measures module 530 may retrospectively evaluate failure prediction models on training, validation (including cross-validation) and testing data sets, and provide performance measure and confidence reports, including but not limited to AUC, accuracy, sensitivity, specificity and precision, and/or the like (as discussed herein regarding cross-validation).

In various embodiments, the performance measures module 530 may evaluate each failure prediction model of a set of failure prediction models for each component, component type, part, group of components, assets, and/or the like as discussed herein.

In various embodiments, performance measures module 530 may assess a performance curvature to assist in selection of a preferred failure prediction model of a set. The performance look-up gives an expected forecasting outcome for a given lookback and lead time requirement. The performance look-up gives a reasonable lookback and lead time that an operator can expect.

In various embodiments, the component failure prediction system 104 may generate the performance curvature, including the lookback and lead times to enable a user or authorized device to select a point along the performance curvature to identify ad select a model with an expected forecasting outcome.

The performance measures module 530 may evaluate performance of each of the set of failure prediction modules utilizing standardized metrics as discussed herein. As such, a failure prediction module may be selected from the set of failure prediction modules based on the testing results and the results of evaluation of the performance measures module 530 (in comparison with testing results and the results of evaluation of other failure prediction modules of the set of failure prediction modules.

Figure 21:
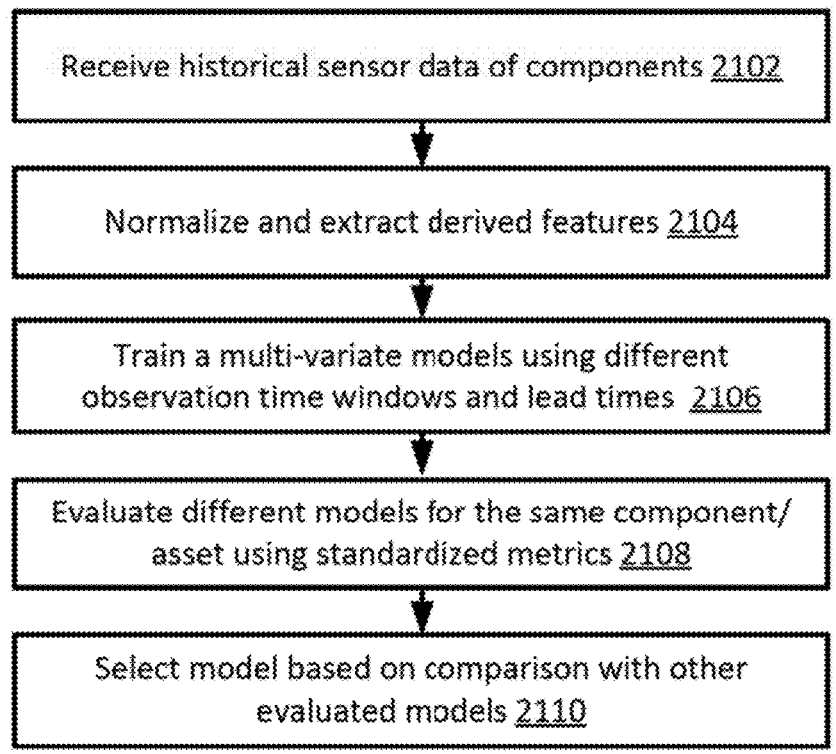
FIG. 21 is a flowchart for predicting failures and/or potential failures of renewable energy assets.

FIG. 21 is a flowchart for predicting failures and/or potential failures of renewable energy assets. In the example of FIG. 21, prediction failures and/or potential failures of wind turbines is discussed. In step 2102, the data interface 502 receives the historical sensor data and/or SCADA information of any number of components of any number of electrical assets. The historical sensor data and/or the SCADA information may have been previously received and processed during the model selection pipeline.

In various embodiments, the component failure prediction system 104 may generate any number of different failure prediction models for a set of failure prediction models, each set of failure prediction models being for each component, component group, type of component, type of component group, and/or the like. Each set of failure prediction models of the set of failure prediction models may vary in terms of the observation window (e.g., limited to a predetermined window of the historical data used to train a model) and/or lead time.

In step 2104, the data processing module 522 and/or the feature extraction module 524 may normalize and/or extract features (e.g., derived or not derived) from the received historical sensor data and/or SCADA information. It will be appreciate that, in some embodiments, the data processing module 522 and/or the feature extraction module 524 may determine the observation window for a model to be trained, extract or receive the historical sensor data and/or patterns from the SCADA information that was generated during or based on information generated during the observation window, and reduce dimensionality of the data (e.g., using principal component analysis) and/or extract features (e.g., columns or metrics) from the historical sensor data to train one or more failure prediction models of the set.

In step 2106, the model training and testing module 534 trains any number of failure prediction models of a set using different observation windows of the historical sensor data and/or lead times for each different model of the same component, component group, type of component, type of component group, and/or the like. The model training and testing module 534 may utilize k-means clustering, neural networks, random forests, or the like.

In step 2108, the performance measures module 530 may evaluate every failure prediction model of a set of failure prediction models. For example, the performance measures module 530 may evaluate every model that predicts failure of a generator of a wind turbine. Each model of the set may vary depending on the observation window and the lead time window used in generating the model.

The performance measures module 530 may utilize standardized metrics as discussed herein to evaluate the models of the set of models. The performance measures module 530 may utilize any or all of the following metrics including, but not limited to, Sensitivity, Recall, Hit Rate, or True Positive Rate (TPR), Specificity or True Negative Rate (TNR), Precision or Positive Predictive Value (PPV), Negative Predictive Value (NPV), Miss Rate or False Negative Rate (FNR), Fall-out or False Negative Rate (FNR), False Discovery Rate (FDR), False Omission Rate (FOR), Accuracy (ACC), the F1 score is the harmonic mean of precision and sensitivity, the Matthews correlation coefficient (MCC), the informedness or Bookmaker Informedness (BM), the Markedness (MK), and/or area under the curve (AUC).

In step 2110, the performance measures module 530 may compare any number of the model evaluations of failure prediction models of a set of failure prediction models to any of the other set of model evaluations to select a preferred model of the set of models. For example, two different failure prediction models of a set with different lookback time (e.g., 31 and 33 days, respectively) and different lead times (e.g., 1 and 3 days, respectively) may have different AUC (71% and 92%, respectively), different train sensitivity (54% and 83%, respectively), different train precision (63% and 83%, respectively), and train specificity (69% and 83%, respectively). It will be appreciated that each failure prediction model of a set may be compared using similar metrics and/or different metrics as described above. Based on the two different failure prediction models in this example, the performance measures module 530 or authorized entity may select the failure prediction model with the longer lead time, higher AUC, train sensitivity, train precision, and train specificity even though the lookback time is larger.

FIG. 22 is a model scoring pipeline 2200 in some embodiments. The model scoring pipeline may utilize much of the same infrastructure as the other pipelines and may be utilized to apply failure prediction models (e.g., those selected by the training and testing pipeline) to new (current) historical sensor data and current SCADA information to predict failures in one or more components. In various embodiments, the model scoring pipeline may produce an alert or report indicating a component failure probability, a lead time window, and/or a failure indicator.

The model scoring pipeline may include a subset of routines to perform model scoring in operation in some embodiments. The model scoring pipeline utilizes the data interface 502, the user/developer input 504, the data extraction module 506, the high-level data quality check module 508, the config template generation module 510, the config generation module 512, the quality check module 514, the data processing module 522, the feature extraction module 524, the feature construction module 526, the feature selection module 528, the load feature dimension module 536, the model scoring module 538, the load selected features module 540, and the load developed model module 542.

Figure 23:
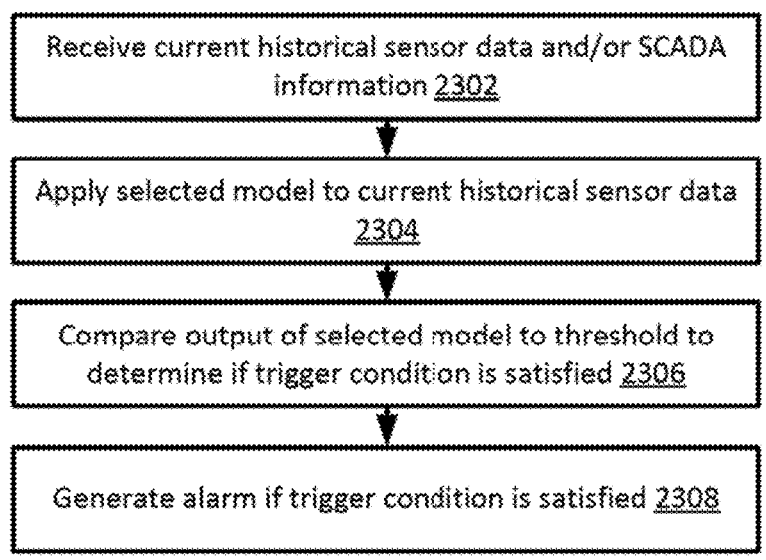
FIG. 23 is a flowchart for predicting failure of one or more components in some embodiments.

FIG. 23 is a flowchart for predicting failure of one or more components in some embodiments. In step 2302, the model scoring module 538 may receive current sensor data (e.g., new sensor data) from the same components or group of components that provided the historical sensor data. The model scoring module 538 may apply the selected failure prediction model to the current sensor data to generate a prediction in step 2304. In various embodiments, based on current sensor data, SCADA information, or user controls, the model scoring module 538 may load models from the load developed model module 542 (which may store selected failure prediction models that were evaluated against other failure prediction models by the performance measures module 530). In some embodiments, the model scoring module 538 may also receive selected features from the load selected features module 540. The selected features may be from the current sensor data and/or SCADA information for application to the selected model and/or utilized to configure the selected model for scoring.

In step 2306, the model scoring module 538 may compare the output of the selected failure prediction model to a threshold to determine if trigger conditions are satisfied. In other words, the model scoring module 538 may compare a probability of accuracy or confidence of a predicted failure to a failure prediction threshold. In various embodiments, the model scoring module 538 may store threshold triggers in a threshold trigger database. There may be different trigger thresholds for different components, component types, groups of components, groups of component types, assets, and/or asset types. In various embodiments, there may be different trigger thresholds depending on the amount of damage that may be caused to the asset by failure, other assets by failure, the electrical grid, infrastructure, property and/or life. There may be different trigger thresholds based on the selected model (e.g., based on sensitivity, accuracy, amount of lead time, predicted time of failure, and/or the like). The different trigger thresholds may be set, in some embodiments, by a power company, authorized individual, authorized digital device, and/or the like.

For example, In various embodiments, the model scoring module 538 may compare new sensor data to classified and/or categorized states identified by the selected model to identify when sensor data indicates a failure state or a state associated with potential failure is reached. In some embodiments, the model scoring module 538 may score the likelihood or confidence of such estate being reached. The model scoring module 538 may compare the confidence or score against a threshold in order to trigger an alert or report. In another example, the model scoring module 538 may compare the fit of sensor data to a failure state or state associate with potential failure that has been identified by the model of the model scoring module 538 in order to trigger or not trigger an alert or report.

The model scoring module 538 may establish thresholds for different components, component types, groups of components, groups of component types, assets, and/or asset types. Each threshold may be compared to an output of one or more selected models. Thresholds may be established based on the performance of the selected model in order to provide an alarm based on likelihood (e.g., confidence) of prediction, seriousness of fault, seriousness of potential effect of the fault (e.g., infrastructure or life threatened), lead time of fault, and/or the like.

It will be appreciated that there may be different categorized states identified during model training. Each categorized state may be associated with a different type of failure including mode of failure, component of failure, and/or the like.

In step 2308, the model scoring module 538 may generate an alert if a trigger condition is satisfied. In some embodiments, the model scoring module 538 may have an alert threshold that must be triggered before the alert is issued. For example, the alert threshold may be based on the amount of damage that may be caused to the asset by failure, other assets by failure, the electrical grid, infrastructure, property and/or life. The alert may be issued by text, SMS, email, instant message, phone call, and/or the like. The alert may indicate the component, component group, type of component, type of component group, and/or the like that triggered the prediction as well as any information relevant to the prediction, like percentage of confidence and predicted time frame.

In various embodiments, a report is generated that may indicate any number of predicted failures of any number of components or groups of components based on application of selected models to different sensor data which may enable the system to provide a greater understanding of system health.

The model scoring module 538 may generate an alert based on the scoring of application of the failure prediction model to the current data. An alert may be a message indicating a failure or type of failure as well as the specific renewable energy asset (e.g., wind turbine or solar panel) that may be at risk of failure. Since the state identified by the failure prediction model is a state that is in advance of a potential failure, the alert should be triggered in advance of the potential failure such that corrective action may take place. In some embodiments, different alerts may be generated based on different possible failure and or different failure states. For example, some failure states may be more serious than others, as such more alerts and/or additional detailed alerts may be provided to a larger number of digital devices (e.g., cell phones, operators, utility companies, service computers, or the like) depending on the seriousness, significance, and/or imminence of failure.

In some embodiments, the model scoring module 538 may generate a report indicating any number of potential failures, the probability of such failure, and the justification or reasoning based on the model and the fit of previously identified states associated with future failure of components.

The model scoring pipeline may enable the component failure prediction system 104 to predict a component failure ahead of the actual failure. As discussed herein, the component failure prediction system 104 may train and evaluate any number of models that predict component failure. In some embodiments, the component failure prediction system 104 trains a set of component failure prediction models for each component or set of components using historical sensor data received from sensors of any number of electrical assets (e.g., including renewable energy electrical assets such as wind turbines). In some embodiments, each set of models predicts failure of a different component of the same or different electrical assets.

The component failure prediction system 104 may cross-validate and train different failure prediction models of a set using the same metrics from historical sensor data but with different lead times and with different amounts of historical sensor data (e.g., different amounts of lookback times). The component failure prediction system 104 may evaluate the failure prediction models of the set based on sensitivity, precision, and/or specificity for the different lookback and lead times. As a result, the component failure prediction system 104 may select a failure prediction model of a set of failure prediction models for each component type (e.g., bearing), component (e.g., specific bearing(s) in one or more assets), component group type (e.g., generator including two or more components), component group (e.g., specific generator(s) including two or more components in one or more assets), asset type (e.g., wind turbines), or group of assets (e.g., specific set of wind turbines).

Metrics used to evaluate performance (e.g., based on values from sensor readings and/or from the sensors themselves) may be the same for different components even if the sensor data from sensors of the different components is different. By standardizing metrics for evaluation, the component failure prediction system 104 may "tune" or change aspects of the failure prediction model and model training to accomplish the goals of acceptable accuracy with acceptable lead time before the predicted failure. This enable improved accuracy for different components of an electrical assets with improved time of prediction (e.g., longer prediction times is preferable).

In some embodiments, the component failure prediction system 104 may apply a multi-variate anomaly detection algorithm to sensors that are monitoring operating conditions of any number of renewable assets (e.g., wind turbines and or solar generators). The component failure prediction system 104 may remove data associated with a past, actual failure of the system (e.g. of any number of components and or devices), therefore highlighting subtle anomalies from normal operational conditions that lead to actual failures.

The component failure prediction system 104 may fine-tune failure prediction models by applying dimensionality reduction techniques to remove noise from irrelevant sensor data (e.g., apply principal component analysis to generate a failure prediction model using linearly uncorrelated data and/or features from the data). For example, the component failure prediction system 104 may utilize factor analysis to identify the importance of features within sensor data. The component failure prediction system 104 may also utilize one or more weighting vectors to highlight a portion or subset of sensor data that has high impact on the failure.

In some embodiments, the component failure prediction system 104 may further scope time series data of the sensor data by removing some sensor data from the actual failure time period. In various embodiments, the component failure prediction system 104 may optionally utilize curated data features to improve the accuracy of detection. Gearbox failure detection, for example, may utilize temperature rise in the gearbox with regards to power generation, reactive power, and ambient temperature.

In some embodiments, the component failure prediction system 104 may receive historical sensor data regarding renewable energy sources (e.g., wind turbines, solar panels, wind farms, solar farms, electrical grants, and/or the like). The component failure prediction system 104 may break down the data in order to identify important features and remove noise of past failures that may impact model building. The historical data may be curated to further identify important features and remove noise. The component failure prediction system 104 may further identify labels or categories for machine learning. It will be appreciated that component failure prediction system 104 may, in some embodiments, identify labels.

The component failure prediction system 104 may receive sensor data regarding any number of components from any number of devices, such as wind turbines from a wind farm. The sensor data may include multivariate timeseries data which, when in combination with the labels or categories for machine learning, may assist for deep learning, latent variable mining, may provide insights for component failure indication. These insights, which may predict upcoming failures, may effectively enable responses to upcoming failures with sufficient lead time before failure impacts other components of energy generation.

It will be appreciated that identifying upcoming failures for any number of components and renewable energy generation may become increasingly important as sources of energy migrate to renewable energy. Failure of one or more components may impact the grid significantly, and as a result may put the electrical grid, or the legacy components of the electrical grid, either under burden or cause them to fail completely. Further, failures of the electrical grid and/or failures of renewable energy sources may threaten loss of property, business, or life particularly at times where energy is critical (e.g., hospital systems, severe weather conditions such as heat waves, blizzards, or hurricanes, care for the sick, care for the elderly, and/or care of the young).

Figure 24:
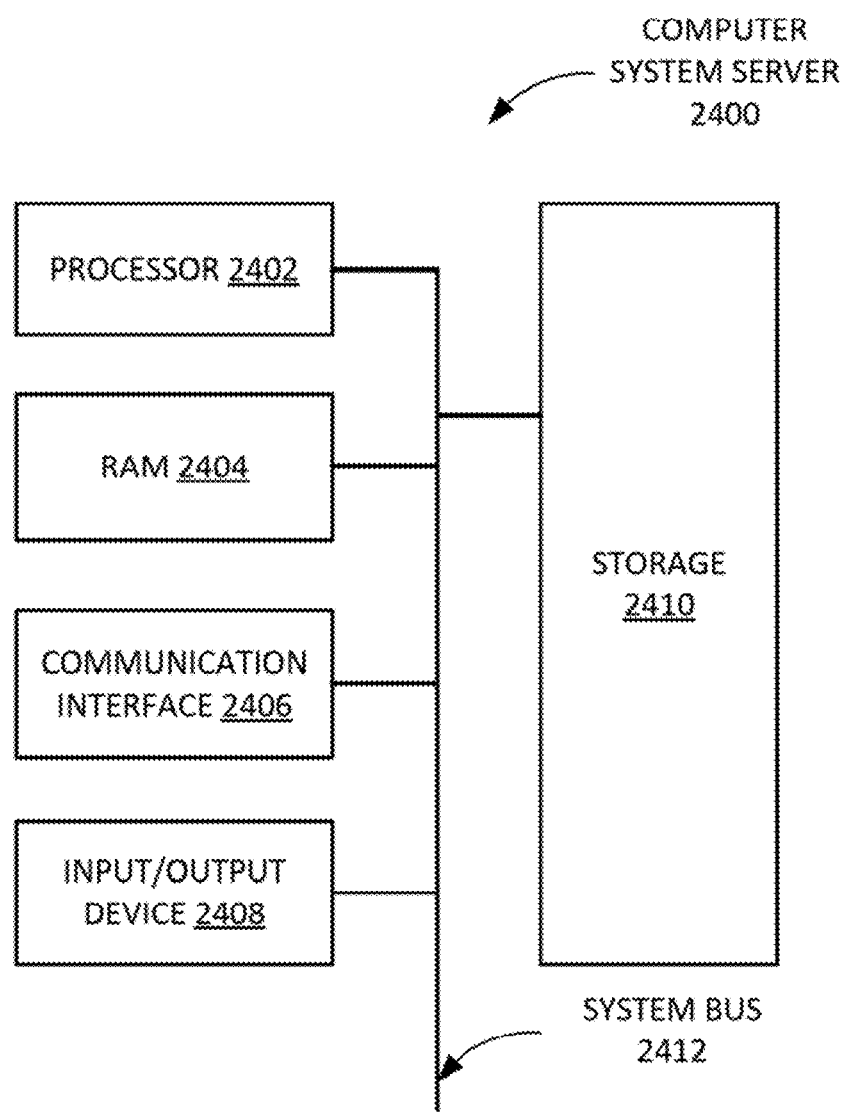
FIG. 24 depicts a block diagram of an example computer system server according to some embodiments.

FIG. 24 depicts a block diagram of an example computer system server 2400 according to some embodiments. Computer system server 2400 is shown in the form of a general-purpose computing device. Computer system server 2400 includes processor 2402, RAM 2404, communication interface 2406, input/output device 2408, storage 2410, and a system bus 2412 that couples various system components including storage 2410 to processor 2402.

System bus 2412 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system server 2400 typically includes a variety of computer system readable media. Such media may be any available media that is accessible by the component failure prediction system 104 and it may includes both volatile and nonvolatile media, removable and non-removable media.

In some embodiments, processor 2402 is configured to execute executable instructions (e.g., programs). In some embodiments, the processor 2402 comprises circuitry or any processor capable of processing the executable instructions.

In some embodiments, RAM 2404 stores data. In various embodiments, working data is stored within RAM 2404. The data within RAM 2404 may be cleared or ultimately transferred to storage 2410.

In some embodiments, communication interface 2406 is coupled to a network via communication interface 2406. Such communication can occur via Input/Output (I/O) device 2408. Still yet, component failure prediction system 104 may communicate with one or more networks such as a local area network (LAN), a general wide area network (WAN), and/or a public network (e.g., the Internet).

In some embodiments, input/output device 2408 is any device that inputs data (e.g., mouse, keyboard, stylus) or outputs data (e.g., speaker, display, virtual reality headset).

In some embodiments, storage 2410 can include computer system readable media in the form of volatile memory, such as read only memory (ROM) and/or cache memory. Storage 2410 may further include other removable/non-removable, volatile/non-volatile computer system storage media. By way of example only, storage 2410 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CDROM, DVD-ROM or other optical media can be provided. In such instances, each can be connected to system bus 2412 by one or more data media interfaces. As will be further depicted and described below, storage 2410 may include at least one program product having a set (e.g., at least one) of program modules that are configured to carry out the functions of embodiments of the invention. In some embodiments, RAM 2404 is found within storage 2410.

Program/utility, having a set (at least one) of program modules, such as component failure prediction system 104, may be stored in storage 2410 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

It should be understood that although not shown, other hardware and/or software components could be used in conjunction with component failure prediction system 104. Examples, include, but are not limited to: microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of one or more embodiments may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A non-transitory computer readable medium comprising executable instructions, the executable instructions being executable by one or more processors to perform a method, the method comprising:
   receiving log data from one or more Supervisory Control and Control and Data Acquisition (SCADA) systems that monitor any number of wind turbines, the log data being generated during a first period of time;
   receiving historical wind turbine component failure data and wind turbine asset data from the one or more SCADA systems, the historical wind turbine component failure data and wind turbine asset data being generated during the first period of time;
   creating cohort instances based on the wind turbine failure data and wind turbine asset data, each cohort representing a subset of the wind turbines, the subset of the wind turbines including a same type of controller and a similar geographical location, the geographical location of the wind turbines of the subset of wind turbines being within the wind turbine asset data;
   generating a feature matrix, the feature matrix including a unique feature identifier for each feature of the log data in the feature matrix;
   extracting patterns of events based on the feature matrix;
   receiving first historical sensor data of the first time period, the first historical sensor data including sensor data from one or more sensors of one or more components of any number of renewable energy assets, the first historical sensor data indicating at least one first failure associated with the one or more components of the renewable energy asset during the first time period;
   generating a first set of failure prediction models using the first historical sensor data and the patterns of events, each of the first set of failure prediction models being trained using different amounts of first historical sensor data based on different observation time windows and different lead time windows, each observation time window including a time period during which first historical data is generated, each lead time window including a period of time before a predicted failure;
   selecting a first selected failure prediction model from the first set of failure prediction models based on positive prediction values of each of the first set of failure prediction models, the positive prediction value being determined based on the predicted failure, and the lead time windows, the first selected failure prediction model including the lead time window;
   receiving first current sensor data of a second time period, the first current sensor data including sensor data from the one or more sensors of the one or more components of the renewable energy asset;
   applying the first selected failure prediction model to the first current sensor data to generate a first failure prediction for a failure of at least one component of the one or more components;
   comparing the first failure prediction to a trigger criteria; and
   generating and transmitting a first alert based on the comparison of the failure prediction to the trigger criteria, the alert indicating the at least one component of the one or more components and information regarding the failure prediction.

2. The non-transitory computer readable medium of claim 1, the method further comprises cleaning of the log data from the event logs, the cleaning comprising discarding event data missing expected information.

3. The non-transitory computer readable medium of claim 1, wherein extracting patterns of events based on the feature matrix comprises counting a number of event codes of events that occurred during a time interval using the feature matrix and sequencing the event codes to show dynamics of events over time.

4. The non-transitory computer readable medium of claim 3, the first historical sensor data being generated by the one or more sensors during the time period.

5. The non-transitory computer readable medium of claim 1, wherein events of the patterns of events occur during the time period.

6. The non-transitory computer readable medium of claim 1, wherein the renewable energy asset is a wind turbine.

7. The non-transitory computer readable medium of claim 1, wherein the first historical sensor data is the historical wind turbine component failure data.

8. The non-transitory computer readable medium of claim 1, wherein the method further comprises retrieving the trigger criteria from a datastore including a plurality of trigger criteria, the trigger criteria being retrieved based at least in part on the at least one component of the one or more components.

9. The non-transitory computer readable medium of claim 1, wherein the method further comprises receiving operational signals from the one or more SCADA systems and extracting features from the operational signals, wherein generating the first set of failure prediction models uses the first historical sensor data, the patterns of events, and extracted features from the operational signals.

10. A component failure prediction system, comprising:
at least one processor; and
memory containing instructions, the instructions being executable by the at least one processor to:
receive log data from one or more Supervisory Control and Control and Data Acquisition (SCADA) systems that monitor any number of wind turbines, the log data being generated during a first period of time;
receive historical wind turbine component failure data and wind turbine asset data from the one or more SCADA systems, the historical wind turbine component failure data and wind turbine asset data being generated during the first period of time;
create cohort instances based on the wind turbine failure data and wind turbine asset data, each cohort representing a subset of the wind turbines, the subset of the wind turbines including a same type of controller and a similar geographical location, the geographical location of the wind turbines of the subset of wind turbines being within the wind turbine asset data;
generate a feature matrix, the feature matrix including a unique feature identifier for each feature of the log data in the feature matrix;
extract patterns of events based on the feature matrix;
receive first historical sensor data of the first time period, the first historical sensor data including sensor data from one or more sensors of one or more components of any number of renewable energy assets, the first historical sensor data indicating at least one first failure associated with the one or more components of the renewable energy asset during the first time period;
generate a first set of failure prediction models using the first historical sensor data and the patterns of events, each of the first set of failure prediction models being trained using different amounts of first historical sensor data based on different observation time windows and different lead time windows, each observation time window including a time period during which first historical data is generated, each lead time window including a period of time before a predicted failure;
select a first selected failure prediction model from the first set of failure prediction models based on positive prediction values of each of the first set of failure prediction models, the positive prediction value being determined based on the predicted failure, and the lead time windows, the first selected failure prediction model including the lead time window;
receive first current sensor data of a second time period, the first current sensor data including sensor data from the one or more sensors of the one or more components of the renewable energy asset;
apply the first selected failure prediction model to the first current sensor data to generate a first failure prediction for a failure of at least one component of the one or more components;
compare the first failure prediction to a trigger criteria; and
generate and transmit a first alert based on the comparison of the failure prediction to the trigger criteria, the alert indicating the at least one component of the one or more components and information regarding the failure prediction.

11. The system of claim 10, wherein extracting patterns of events based on the feature matrix comprises counting a number of event codes of events that occurred during a time interval using the feature matrix and sequencing the event codes to show dynamics of events over time.

12. The system of claim 10, wherein events of the patterns of events occur during the time period.

13. The system of claim 12, wherein the first historical sensor data is generated by the one or more sensors during the time period.

14. The system of claim 10, wherein events of the patterns of events occur during the time period.

15. The system of claim 10, wherein the renewable energy asset is a wind turbine.

16. The system of claim 10, wherein the first historical sensor data is the historical wind turbine component failure data.

17. The system of claim 10, the instructions being further executable by the at least one processor to: retrieve the trigger criteria from a datastore including a plurality of trigger criteria, the trigger criteria being retrieved based at least in part on the at least one component of the one or more components.

18. The system of claim 10, the instructions being further executable by the at least one processor to: receive operational signals from the one or more SCADA systems and extract features from the operational signals, wherein generating the first set of failure prediction models uses the first historical sensor data, the patterns of events, and extracted features rom the operational signals.

19. A method comprising:
receiving log data from one or more Supervisory Control and Control and Data Acquisition (SCADA) systems that monitor any number of wind turbines, the log data being generated during a first period of time;
receiving historical wind turbine component failure data and wind turbine asset data from the one or more SCADA systems, the historical wind turbine component failure data and wind turbine asset data being generated during the first period of time;
creating cohort instances based on the wind turbine failure data and wind turbine asset data, each cohort representing a subset of the wind turbines, the subset of the wind turbines including a same type of controller and a similar geographical location, the geographical location of the wind turbines of the subset of wind turbines being within the wind turbine asset data;
generating a feature matrix, the feature matrix including a unique feature identifier for each feature of the log data in the feature;
extracting patterns of events based on the feature matrix;
receiving first historical sensor data of the first time period, the first historical sensor data including sensor data from one or more sensors of one or more components of any number of renewable energy assets, the first historical sensor data indicating at least one first failure associated with the one or more components of the renewable energy asset during the first time period;
generating a first set of failure prediction models using the first historical sensor data and the patterns of events, each of the first set of failure prediction models being trained using different amounts of first historical sensor data based on different observation time windows and different lead time windows, each observation time window including a time period during which first historical data is generated, each lead time window including a period of time before a predicted failure;
selecting a first selected failure prediction model from the first set of failure prediction models based on positive prediction values of each of the first set of failure prediction models, the positive prediction value being determined based on the predicted failure, and the lead time windows, the first selected failure prediction model including the lead time window;

receiving first current sensor data of a second time period, the first current sensor data including sensor data from the one or more sensors of the one or more components of the renewable energy asset;

applying the first selected failure prediction model to the first current sensor data to generate a first failure prediction for a failure of at least one component of the one or more components;

comparing the first failure prediction to a trigger criteria; and generating and transmitting a first alert based on the comparison of the failure prediction to the trigger criteria, the alert indicating the at least one component of the one or more components and information regarding the failure prediction.

* * * * *